(12) United States Patent
Sora

(10) Patent No.: US 11,374,455 B2
(45) Date of Patent: Jun. 28, 2022

(54) ROTARY ELECTRIC MACHINE

(71) Applicant: Mitsubishi Electric Corporation, Tokyo (JP)

(72) Inventor: Nobuyuki Sora, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 186 days.

(21) Appl. No.: 16/631,870

(22) PCT Filed: Jul. 27, 2017

(86) PCT No.: PCT/JP2017/027151
§ 371 (c)(1),
(2) Date: Jan. 17, 2020

(87) PCT Pub. No.: WO2019/021408
PCT Pub. Date: Jan. 31, 2019

(65) Prior Publication Data
US 2020/0161921 A1  May 21, 2020

(51) Int. Cl.
*H02K 3/42* (2006.01)
*H02K 3/28* (2006.01)

(52) U.S. Cl.
CPC .............. *H02K 3/42* (2013.01); *H02K 3/28* (2013.01)

(58) Field of Classification Search
CPC .. H02K 3/00; H02K 3/12; H02K 3/14; H02K 3/18; H02K 3/28; H02K 3/42
See application file for complete search history.

(56) References Cited

U.S. PATENT DOCUMENTS 3,408,517 A 10/1968 Willyoung
2003/0067238 A1* 4/2003 Luttrell ................ H02K 15/065
310/184

(Continued)

FOREIGN PATENT DOCUMENTS

JP  2009100549 A  5/2009
JP  2009183102 A  8/2009

(Continued)

OTHER PUBLICATIONS

International Search Report (PCT/ISA/210) dated Oct. 24, 2017, by the Japanese Patent Office as the International Searching Authority for International Application No. PCT/JP2017/027151.

(Continued)

*Primary Examiner* — Tran N Nguyen
(74) *Attorney, Agent, or Firm* — Buchanan Ingersoll & Rooney PC

(57) ABSTRACT

A rotary electric machine includes: a rotor which has two poles, and a stator in which eighty four slots are formed, wherein conductors are connected in an order of a conductor X+1t, a conductor X−1b, a conductor X+3t, a conductor X−4b, a conductor X+6t, a conductor X−6b, a conductor X+8t, a conductor X−8b, a conductor X+10t, a conductor X−10b, a conductor X+11t, a conductor X−11b, a conductor X+13t, and a conductor X−13b, in first U, V and W phase series circuits; and conductors are connected in an order of a conductor X+2t, a conductor X−2b, a conductor X+4t, a conductor X−3b, a conductor X+5t, a conductor X−5b, a conductor X+7t, a conductor X−7b, a conductor X+9t, a conductor X−9b, a conductor X+12t, a conductor X−12b, a conductor X+14t, and a conductor X−14b, in second U, V and W phase series circuits.

3 Claims, 18 Drawing Sheets

(56) References Cited

U.S. PATENT DOCUMENTS

| | | | | |
|---|---|---|---|---|
| 2003/0122441 A1* | 7/2003 | Masegi | .............. | H02K 15/0037 |
| | | | | 310/208 |
| 2004/0119362 A1* | 6/2004 | Neet | ........................ | H02K 3/12 |
| | | | | 310/208 |
| 2009/0160286 A1* | 6/2009 | Wolf | .................. | H02K 15/0414 |
| | | | | 310/206 |
| 2009/0195105 A1* | 8/2009 | Tokumasu | ............... | H02K 3/28 |
| | | | | 310/198 |
| 2015/0123508 A1* | 5/2015 | Yoshida | ................... | H02K 3/28 |
| | | | | 310/195 |
| 2017/0170698 A1* | 6/2017 | Tanaka | ..................... | H02K 3/28 |

FOREIGN PATENT DOCUMENTS

| | | | |
|---|---|---|---|
| JP | 2015091205 A | 5/2015 | |
| JP | 2017108572 A | 6/2017 | |

OTHER PUBLICATIONS

Written Opinion (PCT/ISA/237) dated Oct. 24, 2017, by the Japanese Patent Office as the International Searching Authority for International Application No. PCT/JP2017/027151.
Extended European Search Report dated Jun. 18, 2020 for corresponding European patent application No. 17919538.3, 11 pages.

* cited by examiner

FRONT SIDE BACK SIDE

ROTARY ELECTRIC MACHINE

FIELD OF THE INVENTION

The present invention relates to a rotary electric machine, and more particularly, relates to a three phase two pole rotary electric machine whose stator is equipped with eighty four slots.

BACKGROUND OF THE INVENTION

Rotary electric machines, such as an intermediate to large capacity rotary electric machine, a turbine generator, and the like, have a stator iron core which is equipped with slots for installing stator coils. In the rotary electric machine with intermediate to large amount of capacity, the turbine generator, and the like, the stator coil is generally configured to include parallel connected circuits, for the purposes of the reduction of the impedance in stator coils, or the reduction of leakage reactance, or the reduction of voltage, or the like (for example, refer to Patent Document 1 and Patent Document 2). Particularly, in a two pole turbine generator with large amount of capacity, it is considered that the wire connection exceeding three parallels in number is necessary in the parallel connected circuits.

In those stator coils of the rotary electric machine, an upper opening side coil (an inner circumference side winding wire) and a lower opening side coil (an outer circumference side winding wire) are formed in one slot. The upper opening side coil and the lower opening side coil, which are disposed within a slot, are connected at a coil end, by a wire connection method called a two layered winding. In a two pole four parallel winding wire structure, if there is, among the circuits, a difference in the voltages which are generated in the parallel connected circuits, a circulating current will flow so that this voltage difference may become zero.

When heat is produced by the circulating current, there occurs the rise in temperature of a coil, the decline in energy efficiency, and the like. In order to reduce the loss of the energy efficiency by the circulating current, it is important to make the unbalance as small as possible which occurs in the generated voltage of a parallel connected circuit. For that purpose, special consideration is required in the arrangement of coils which belong to respective series circuits in each of the phase belts.

In the rotary electric machine of a two pole four parallel winding wire structure, a method of changing the combination in the coil connection is known as a method for suppressing the circulating current. For example, a wire connection method for reducing a circulating current is disclosed in Patent Document 1, concerning the rotary electric machine which has a stator iron core equipped with eighty four slots.

In the rotary electric machine in accordance with Patent Document 1, the combination in the coil connection has been changed, taking into account the balance of voltages which are generated at the time when a parallel connected circuit is released. The unbalance in the parallel connected circuit can be suppressed by changing the combination in the coil connection like this way and disposing conductors. In the literature, two jumper lines are used in each of the phase belts, in order to change the combination in the coil connection. The arrangement mentioned right before has a feature in that the component count is low in number, and working hours can be reduced.

CITATION LIST

Patent Literature

Patent documents 1: JP 2009-183102 A
Patent documents 2: JP 2009-100549 A

SUMMARY OF THE INVENTION

Technical Problem

In the two pole four parallel winding wire structure, a lead out wire and a coil end are connected with a lead wire, for taking out the output. According to the wire connection which is disclosed in Patent Document 1, jumper lines are attached in the vicinity of the lead wire. The attachment of a jumper line requires the complicated work for engineering and a large space for installing. Accordingly, in the case of attaching a jumper line in the vicinity of the lead wire, the arrangement of the jumper line influences the design of the lead wire to a large extent.

The present invention is made in view of the above mentioned point, in the rotary electric machine. The object of the present invention is to suppress circulating currents among the circuits, in the rotary electric machine which is provided with stator coils of the two pole four parallel winding wire structure.

Solution to Problem

A rotary electric machine in accordance with the present invention comprises:
a rotor which has two poles, and
a stator in which eighty four slots are formed,
wherein a first coil piece denoted by t and a second coil piece denoted by b are disposed in each slot of the stator;
the first coil piece and the second coil piece both form a six phase belt which consists of a U phase+belt, a U phase−belt, a V phase+belt, a V phase−belt, a W phase+belt, and a W phase−belt;
the first coil piece which forms the six phase belt is referred to as a conductor U+nt, a conductor W−nt, a conductor V+nt, a conductor U−nt, a conductor W+nt, a conductor V−nt, where n is used to denote a natural number of 1 to 14;
and the second coil piece is referred to as a conductor U+nb, a conductor W−nb, a conductor V+nb, a conductor U−nb, a conductor W+nb, and a conductor V−nb, where n is used to denote a natural number of 1 to 14;
a conductor U+1t to a conductor U+14t, a conductor U−1b to a conductor U−14b, a conductor U+1b to a conductor U+14b, and a conductor U−1t to a conductor U−14t form a four row parallel winding wire structure of U phase which consists of a first U phase series circuit, a second U phase series circuit, a third U phase series circuit, and a fourth U phase series circuit;
a conductor V+1t to a conductor V+14t, a conductor V−1b to a conductor V−14b, a conductor V+1b to a conductor V+14b, and a conductor V−1t to a conductor V−14t form a four row parallel winding wire structure of V phase which consists of a first V phase series circuit, a second V phase series circuit, a third V phase series circuit, and a fourth V phase series circuit;
a conductor W+1t to a conductor W+14t, a conductor W−1b to a conductor W−14b, a conductor W+1b to a conductor W+14b, and a conductor W−1t to a conductor W−14t form a four row parallel winding wire structure of W phase which consists of a first W phase series circuit, a second W phase series circuit, a third W phase series circuit, and a fourth W phase series circuit;

when X is used to denote any one of U, V, and W, conductors are connected in an order of a conductor X+1t, a conductor X−1b, a conductor X+3t, a conductor X−4b, a conductor X+6t, a conductor X−6b, a conductor X+8t, a conductor X−8b, a conductor X+10t, a conductor X−10b, a conductor X+11t, a conductor X−11b, a conductor X+13t, and a conductor X−13b in the first U phase series circuit, the first V phase series circuit, and the first W phase series circuit; and conductors are connected in an order of a conductor X+2t, a conductor X−2b, a conductor X+4t, a conductor X−3b, a conductor X+5t, a conductor X−5b, a conductor X+7t, a conductor X−7b, a conductor X+9t, a conductor X−9b, and a conductor X+12t, a conductor X−12b, a conductor X+14t, and a conductor X−14b in the second U phase series circuit, the second V phase series circuit, and the second W phase series circuit.

Advantageous Effects of Invention

A rotary electric machine in accordance with the present invention comprises:
a rotor which has two poles, and
a stator in which eighty four slots are formed,
wherein a first coil piece denoted by t and a second coil piece denoted by b are disposed in each slot of the stator;
the first coil piece and the second coil piece both form a six phase belt which consists of a U phase+belt, a U phase−belt, a V phase+belt, a V phase−belt, a W phase+belt, and a W phase−belt;
the first coil piece which forms the six phase belt is referred to as a conductor U+nt, a conductor W−nt, a conductor V+nt, a conductor U−nt, a conductor W+nt, a conductor V−nt, where n is used to denote a natural number of 1 to 14;
and the second coil piece is referred to as a conductor U+nb, a conductor W−nb, a conductor V+nb, a conductor U−nb, a conductor W+nb, and a conductor V−nb, where n is used to denote a natural number of 1 to 14;
a conductor U+1t to a conductor U+14t, a conductor U−1b to a conductor U−14b, a conductor U+1b to a conductor U+14b, and a conductor U−1t to a conductor U−14t form a four row parallel winding wire structure of U phase which consists of a first U phase series circuit, a second U phase series circuit, a third U phase series circuit, and a fourth U phase series circuit;
a conductor V+1t to a conductor V+14t, a conductor V−1b to a conductor V−14b, a conductor V+1b to a conductor V+14b, and a conductor V−1t to a conductor V−14t form a four row parallel winding wire structure of V phase which consists of a first V phase series circuit, a second V phase series circuit, a third V phase series circuit, and a fourth V phase series circuit;
a conductor W+1t to a conductor W+14t, a conductor W−1b to a conductor W−14b, a conductor W+1b to a conductor W+14b, and a conductor W−1t to a conductor W−14t form a four row parallel winding wire structure of W phase which consists of a first W phase series circuit, a second W phase series circuit, a third W phase series circuit, and a fourth W phase series circuit;
when X is used to denote any one of U, V, and W,
conductors are connected in an order of a conductor X+1t, a conductor X−1b, a conductor X+3t, a conductor X−4b, a conductor X+6t, a conductor X−6b, a conductor X+8t, a conductor X−8b, a conductor X+10t, a conductor X−10b, a conductor X+11t, a conductor X−11b, a conductor X+13t, and a conductor X−13b in the first U phase series circuit, the first V phase series circuit, and the first W phase series circuit; and conductors are connected in an order of a conductor X+2t, a conductor X−2b, a conductor X+4t, a conductor X−3b, a conductor X+5t, a conductor X−5b, a conductor X+7t, a conductor X−7b, a conductor X+9t, a conductor X−9b, and a conductor X+12t, a conductor X−12b, a conductor X+14t, and a conductor X−14b in the second U phase series circuit, the second V phase series circuit, and the second W phase series circuit.

Accordingly, the stator is provided with a two pole four parallel winding wire structure, and circulating currents can be suppressed among the circuits. Further, jumper lines require only two connection points per phase belt to finish the connection of conductors. In addition, it is possible to provide a rotary electric machine which is free from the attached jumper line's influence on the structural design of a lead wire.

DETAILED DESCRIPTION OF THE INVENTION

Figure 1:
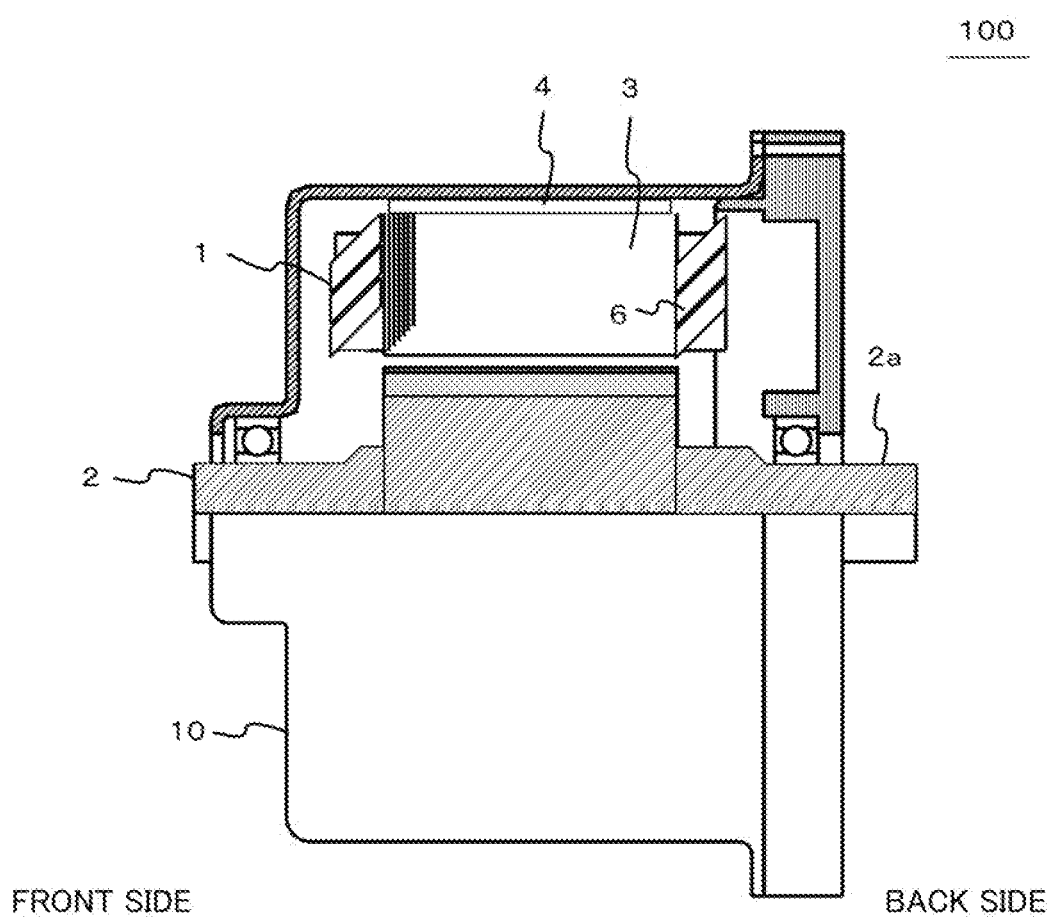
FIG. 1 is a half sectional view which shows the internal structure of a rotary electric machine in accordance with Embodiment of the present invention.

Hereinafter, a rotary electric machine according to the embodiment of the present invention will be described, with reference to drawings. Incidentally, the same reference numerals are given to those identical or similar to constitutional portions in respective drawings and the size and/or the scale size of the corresponding respective constitutional portions are respectively independent. For example, when the identical constitutional portions, which are not changed, are shown, the size and/or the scale size of the identical constitutional portions may be different among sectional views in which a part of the configuration is changed. Furthermore, although the configurations of the rotary electric machine are further actually provided with a plurality of members, for ease of explanation, only portions necessary for explanation will be described and other portions are omitted.

Embodiment

Hereinafter, explanation will be made about a rotary electric machine in accordance with an embodiment of the present invention, with reference to drawings. It is to be noted that, in each of the working examples, the same sign is used for the identical constitutional portions. FIG. 1 is a half sectional view which shows the internal structure of a rotary electric machine 100. The rotary electric machine 100 in accordance with Embodiment of the present invention is provided with a stator 1, a rotor 2, and a case 10. The stator 1 is composed of a stator iron core 3, a yoke 4, a coil 6, and others. The rotor 2 has a rotational axis 2a (a shaft). The rotor 2 and the stator 1 are stored in the case 10. The stator 1 (and a stator iron core 3) is disposed at the outer circumference side of the rotor 2. The yoke 4 is disposed at the outer circumference side of the stator iron core 3.

The coil 6 is wound around the surrounding of a layer stacked stator iron core, in order to generate a rotating field. The coil 6, which is wound around the stator iron core 3, will be connected to, for example, an external inverter. For example, when an alternative current of three phases (U phase, V phase, W phase) is supplied to the coil 6, a rotating field will be generated in the stator 1. Such a rotary electric machine 100 can be applied to a brushless motor provided in the home electrical equipment, or a driving motor used in the common industrial machinery, or an intermediate to large capacity rotary electric machine, or a turbine generator, or the like.

Figure 2:
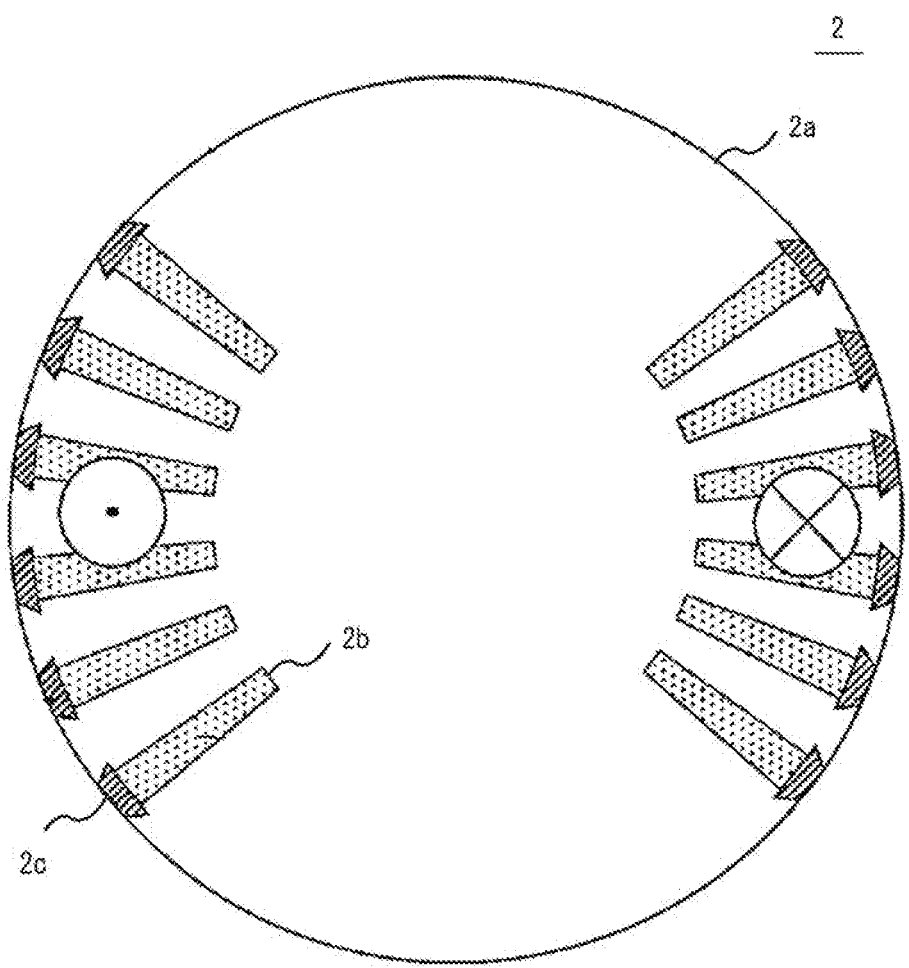
FIG. 2 is a schematic configuration diagram which represents a rotor of the rotary electric machine in accordance with Embodiment of the present invention.

FIG. 2 is a schematic configuration diagram which represents a rotor 2 of the rotary electric machine 100 in accordance with Embodiment of the present invention. The rotor 2 in accordance with Embodiment of the present invention has a two pole rotor structure. A conductive line 2b is wound around a rotational axis 2a (a shaft) which is made of iron. When a direct current flows through the conductive line 2b (the winding wire), the rotor 2 will become an electromagnet with two poles (N pole and S pole). A wedge 2c is used to fix the conductive line 2b on a slot, so that the conductive line 2b (the winding wire) of the rotor 2 may not jump out during the rotation of the rotor.

Figure 3:
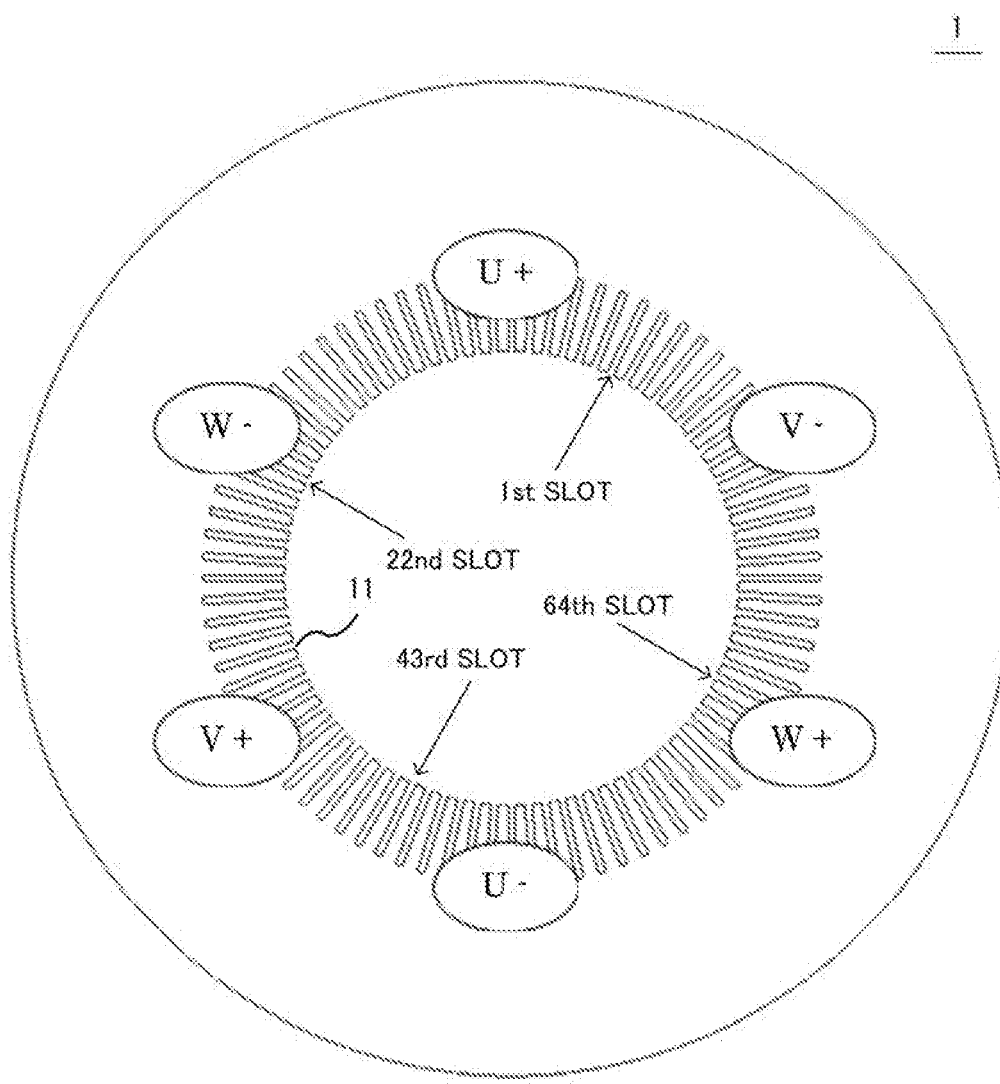
FIG. 3 is a schematic configuration diagram which represents a stator of the rotary electric machine in accordance with Embodiment of the present invention.

FIG. 3 is a schematic configuration diagram which represents a stator 1 of the rotary electric machine 100 in accordance with Embodiment of the present invention. The stator 1 includes eighty four slots 11, which are disposed on the inside of the stator iron core 3a with equally spaced intervals. Within one slot, an upper opening side coil (an inner circumference side coil) and a lower opening side coil (an outer circumference side coil) are disposed. Owing to the above configuration, a two layered winding wire is formed in each of the slots, where an upper layer winding wire and a lower layer winding wire are disposed. An electric generator has the two layered winding structure in which two conductors (coils) are disposed within a slot. As for the conductors of the electric generator, 168 half coils are disposed in the eighty four slots 11, because one conductor is made of ½ turn.

An upper opening side coil (a first coil piece) and a lower opening side coil (a second coil piece) are connected one after the other, and form a three phase (U phase:V phase:W phase) armature winding wire. The armature winding wire has two phase belts per phase. Owing to the above configuration, the stator 1 in accordance with Embodiment of the present invention has a six phase–belt, which consists of a U phase+belt, a W phase–belt, a V phase+belt, a U phase–belt, a W phase+belt, and a V phase–belt. It is determined that each phase belt in the armature winding wire structure is counted in the counter clockwise direction.

Figure 4:
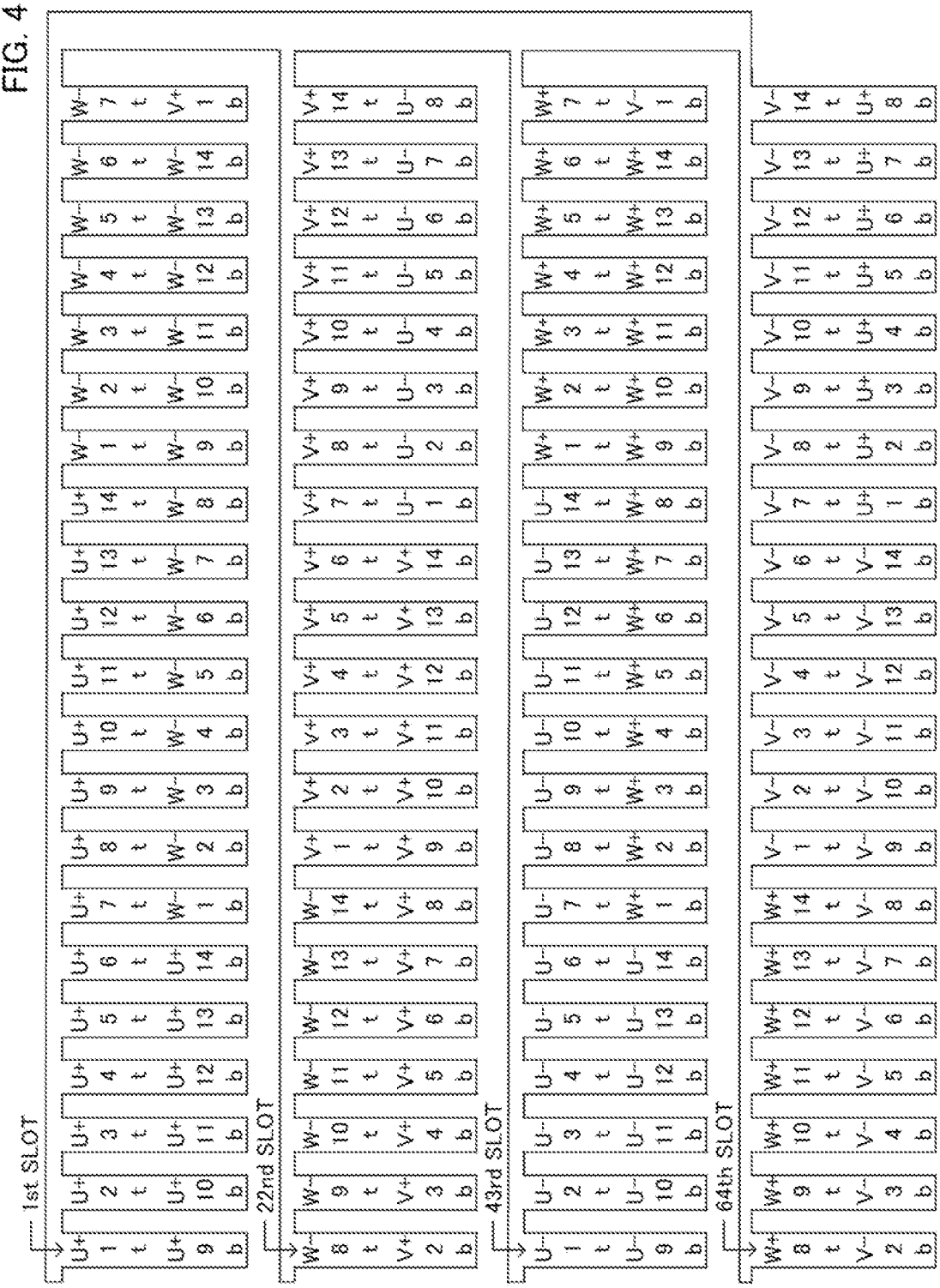
FIG. 4 is an illustration which represents the arrangement of a three phase armature winding wire formed in the slot in accordance with Embodiment of the present invention.

FIG. 4 represents an example of the configuration of three phase armature winding wires which are formed in the slots. In the drawing, eighty four slots (a first slot to an eighty fourth slot) are illustrated in sequence on four shelves. On a first shelf, forty two conductors which are stored in a first slot to a twenty first slot are shown in the drawing. On a second shelf, forty two conductors which are stored in a twenty second slot to a forty second slot are shown in the drawing. On a third shelf, forty two conductors which are stored in a forty third slot to a sixty third slot are shown in the drawing. On a fourth shelf, forty two conductors which are stored in a sixty fourth slot to an eighty fourth slot are shown in the drawing.

Two conductors (an upper opening side coil and a lower opening side coil) are disposed in each of the slots. The upper opening side coil (the first coil piece) will be denoted by t. The lower opening side coil (the second coil piece) will be denoted by b. A conductor X+nt denotes an nth upper opening side coil of X phase+belt. A conductor X+nb denotes an nth lower opening side coil of X phase+belt. A conductor X−nt denotes an nth upper opening side coil of X phase−belt. A conductor X−nb denotes an nth lower opening side coil of X phase−belt. Here, n is a natural number of 1 to 14. Further, X phase points out any one of the three phases (U phase:V phase:W phase).

The upper opening side coil consists of a conductor U+1t to a conductor U+14t, a conductor W−1t to a conductor W−14t, a conductor V+1t to a conductor V+14t, a conductor U−1t to a conductor U−14t, a conductor W+1t to a conductor W+14t, and a conductor V−1t to a conductor V−14t. The lower opening side coil consists of a conductor U+1b to a conductor U+14b, a conductor W−1b to a conductor W−14b, a conductor V+1b to a conductor V+14b, a conductor U−1bb to a conductor U−14b, a conductor W+1b to a conductor W+14b, and a conductor V−1b to a conductor V−14b. The conductor U+1b and the conductor U+9b are disposed in the same slot. In the drawing, the conductor U+1t and the conductor U−1b are separated with thirty four slots in the counter clockwise direction, and the slot pitch between those conductors is, however, not limited to this case.

Figure 5:
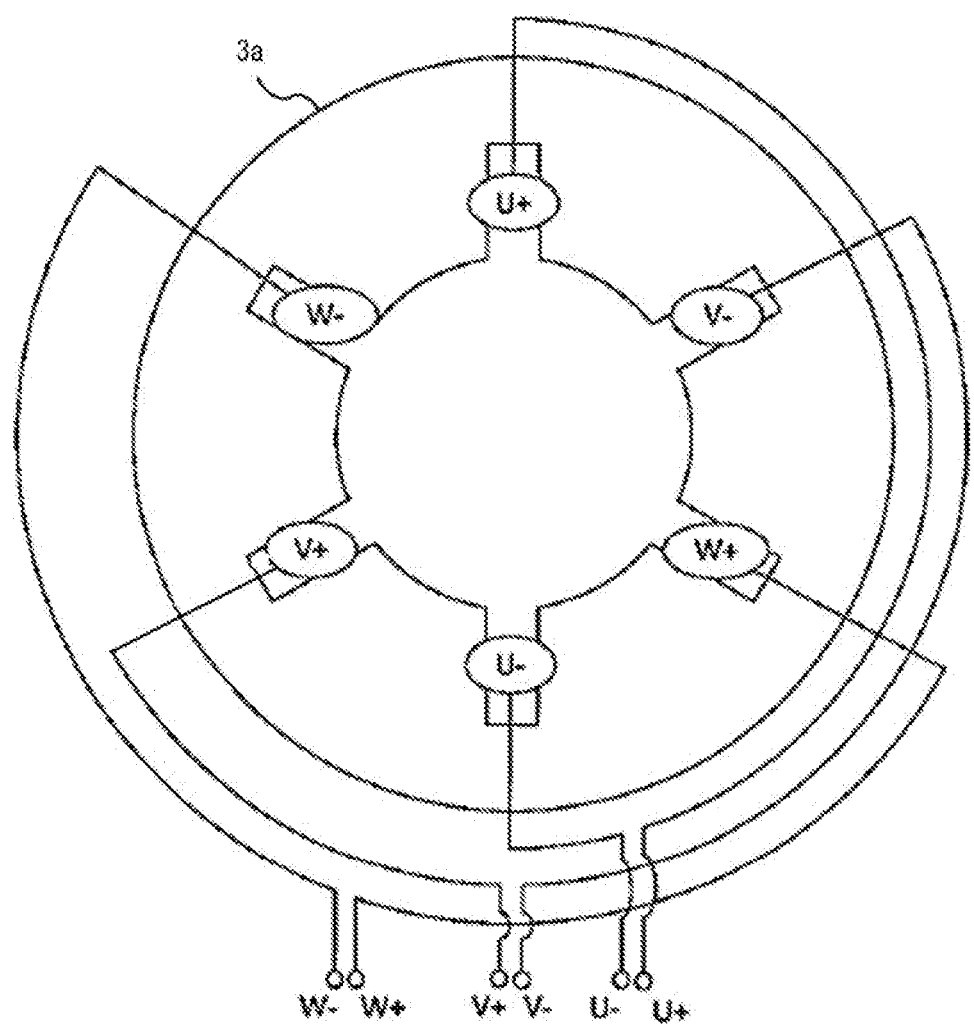
FIG. 5 is an illustration which represents schematically the structure of the armature winding wire in accordance with Embodiment of the present invention.

FIG. 5 represents schematically the structure of an armature winding wire in accordance with Embodiment of the present invention. The armature winding wire in accordance with Embodiment of the present invention has a two pole three phase winding wire structure. The two pole three phase armature winding wire consists of U phase belts (a U phase+belt and a U phase−belt), V phase-belts (a V phase+ belt and a V phase−belt), and W phase−belts (a W phase+ belt and a W phase−belt), and those phase belts are disposed so that each phase may have a different rotational angle of 120 degrees. In the case of an electric generator, the coils of the rotary electric machine 100 are adopted with the distribution winding. A U phase+terminal, a V phase+terminal, and a W phase+terminal are connected to the electric power system, and the distribution of electric power is performed at those terminals. A U phase−terminal, a V phase−terminal, and a W phase−terminal serve as a neutral point.

Figure 6:
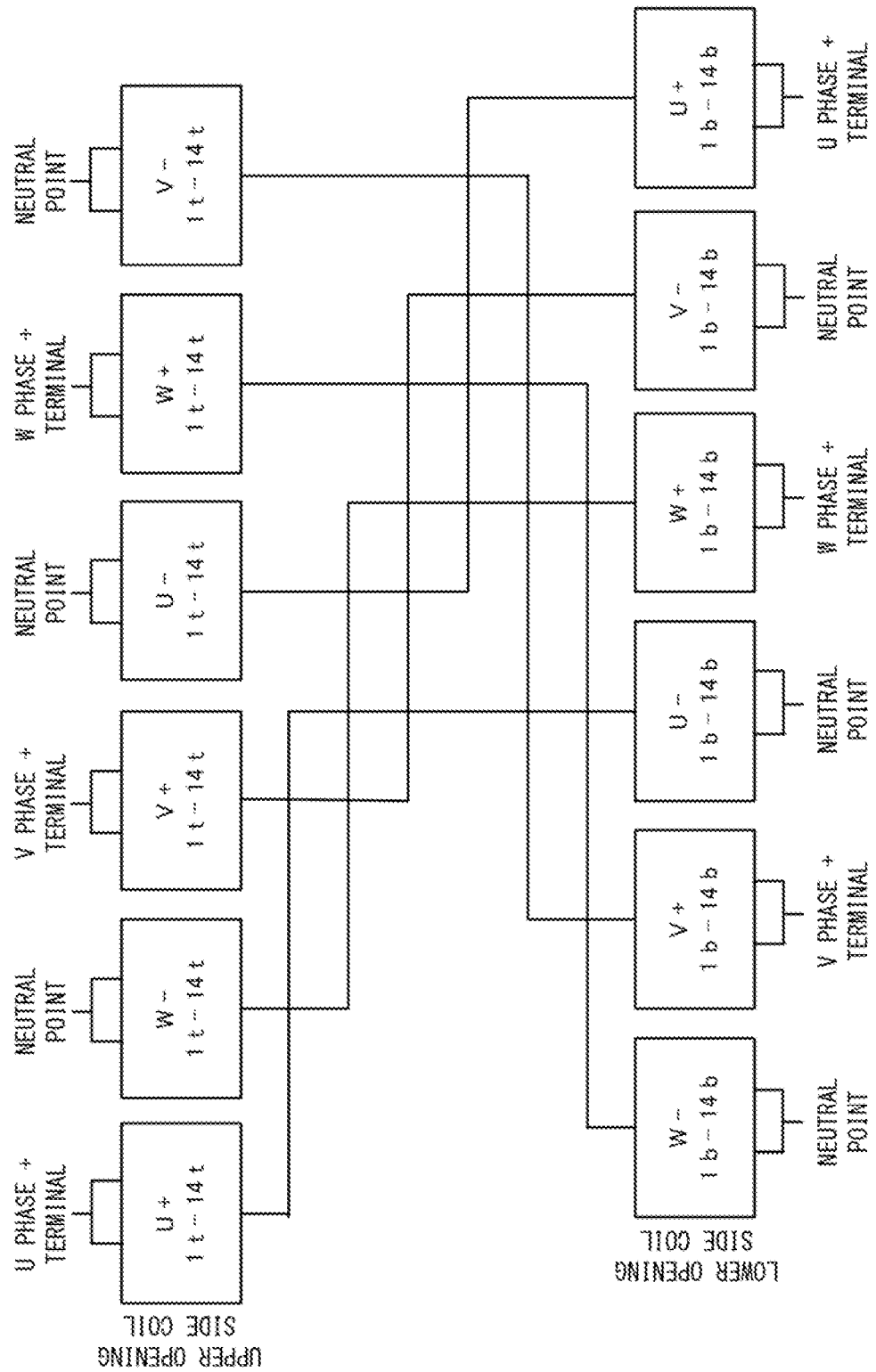
FIG. 6 is a first illustration which represents the simplified structure of the armature winding wire in accordance with Embodiment of the present invention.

FIG. 6 is a drawing which illustrates a simplified structure of the armature winding wire in accordance with Embodiment of the present invention. The conductor U+1t to the conductor U+14t and the conductor U−1b to the conductor U−14b are connected by the wire connection method in accordance with Embodiment of the present invention in order to reduce a circulating current, and two series circuits are formed by those conductors. In each of the series circuits, a plus side will be connected to the U phase+ terminal, and a minus side will be connected to the neutral point. The conductor U−1t to the conductor U−14t and the conductor U+1b to the conductor U+14b are connected by the wire connection method in accordance with Embodiment of the present invention in order to reduce a circulating current, and two series circuits are formed by those conductors. In each of the series circuits, a plus side is connected to the U phase+terminal, and a minus side is connected to the neutral point. Therefore, the U phase armature winding wire is provided with a four row parallel winding wire structure which consists of four series circuits. Here, one series circuit of the U phase is composed of fourteen conductors.

The conductor V+1t to the conductor V+14t and the conductor V−1b to the conductor V−14b are connected by the wire connection method in accordance with Embodiment of the present invention in order to reduce a circulating current, and two series circuits are formed by those conductors. In each of the series circuits, a plus side is connected to a U phase+terminal, and a minus side is connected to the neutral point. The conductor V−1t to the conductor V−14t and the conductor V+1b to the conductor V+14b are connected by the wire connection method in accordance with Embodiment of the present invention in order to reduce a circulating current, and two series circuits are formed by those conductors. In each of the series circuits, a plus side is connected to the V phase+terminal, and a minus side is connected to the neutral point. Therefore, the V phase armature winding wire is provided with a four row parallel winding wire structure which consists of four series circuits. Here, one series circuit of the V phase is composed of fourteen conductors.

The conductor W+1t to the conductor W+14t and the conductor W−1b to the conductor W−14b are connected by the wire connection method in accordance with Embodiment of the present invention in order to reduce a circulating current, and two series circuits are formed by those conductors. In each of the series circuits, a plus side is connected to the U phase+terminal, and a minus side is connected to the neutral point. The conductor W−1t to the conductor W−14t and the conductor W+1b to the conductor W+14b are connected by the wire connection method in accordance with Embodiment of the present invention in order to reduce a circulating current, and two series circuits are formed by those conductors. In each of the series circuits, a plus side is connected to the W phase+terminal, and a minus side is connected to the neutral point. Therefore, the W phase armature winding wire is provided with a four row parallel winding wire structure which consists of four series circuits. Here, one series circuit of the W phase is composed of fourteen conductors.

Figure 7:
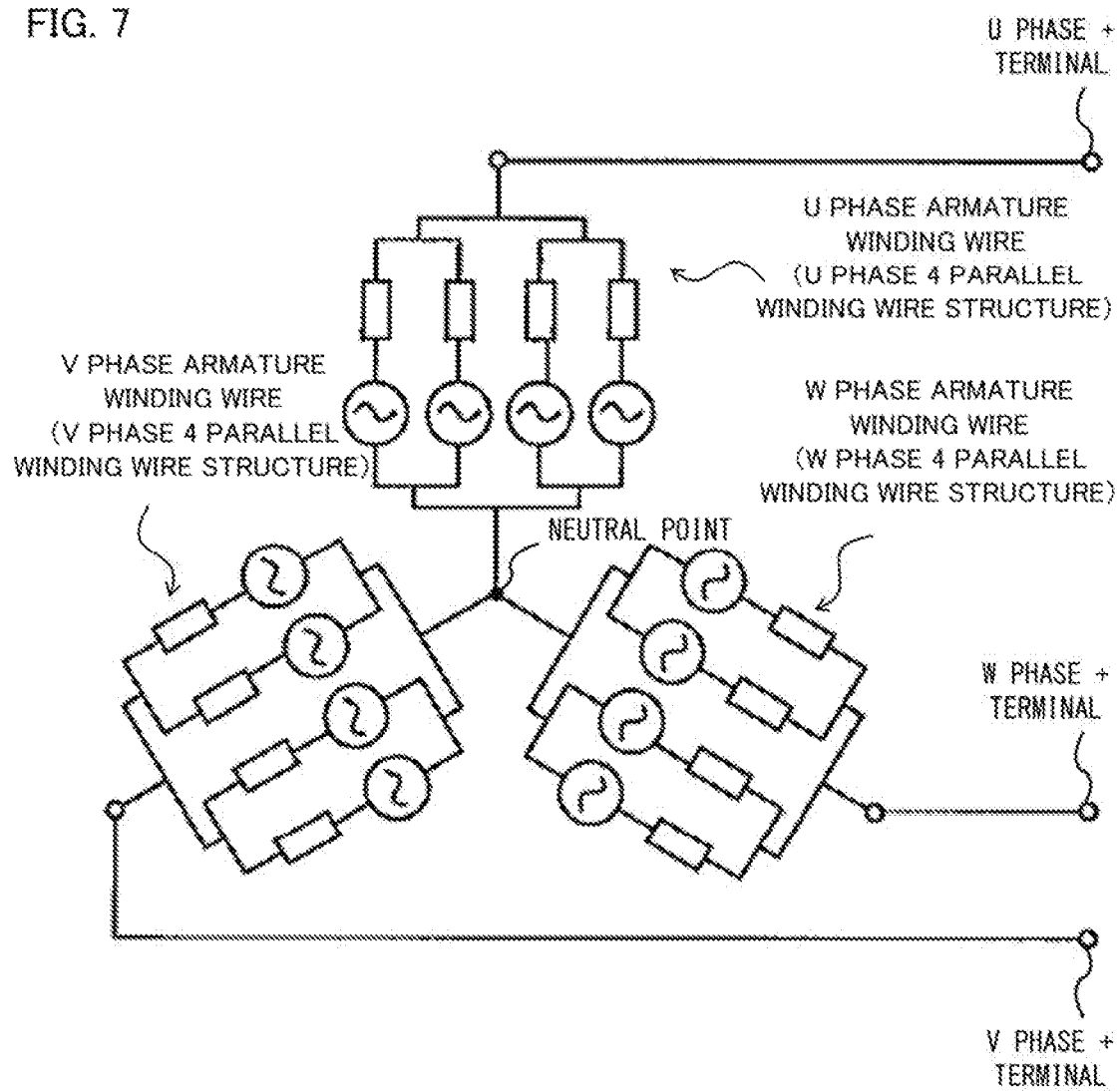
FIG. 7 is a second illustration which represents the simplified structure of the armature winding wire in accordance with Embodiment of the present invention.

FIG. 7 is a drawing which represents a simplified structure of the armature winding wire in accordance with Embodiment of the present invention. The U phase armature winding wire, the V phase armature winding wire, and the W phase armature winding wire are each provided with a four row parallel winding wire structure. The four row parallel winding wire structure is configured to have four series winding wires which are connected in parallel. If voltages which are induced in each of the series winding wires are different from each other in the absolute value and the phase, a circulating current will flow among the circuits. As for the U phase armature winding wire, the V phase armature winding wire, and the W phase armature winding wire, the minus side terminals (the U phase−terminal, the V phase− terminal, and the W phase−terminal) are connected to the neutral point. The U phase+terminal, the V phase+terminal, and the W phase+terminal are each connected to the electric power system, and the distribution of electric power is performed at those terminals. In the armature winding wire in accordance with Embodiment of the present invention, a special wire connection structure is applied, in order to reduce a circulating current and lower the generating loss in the armature winding wire.

Figure 8:
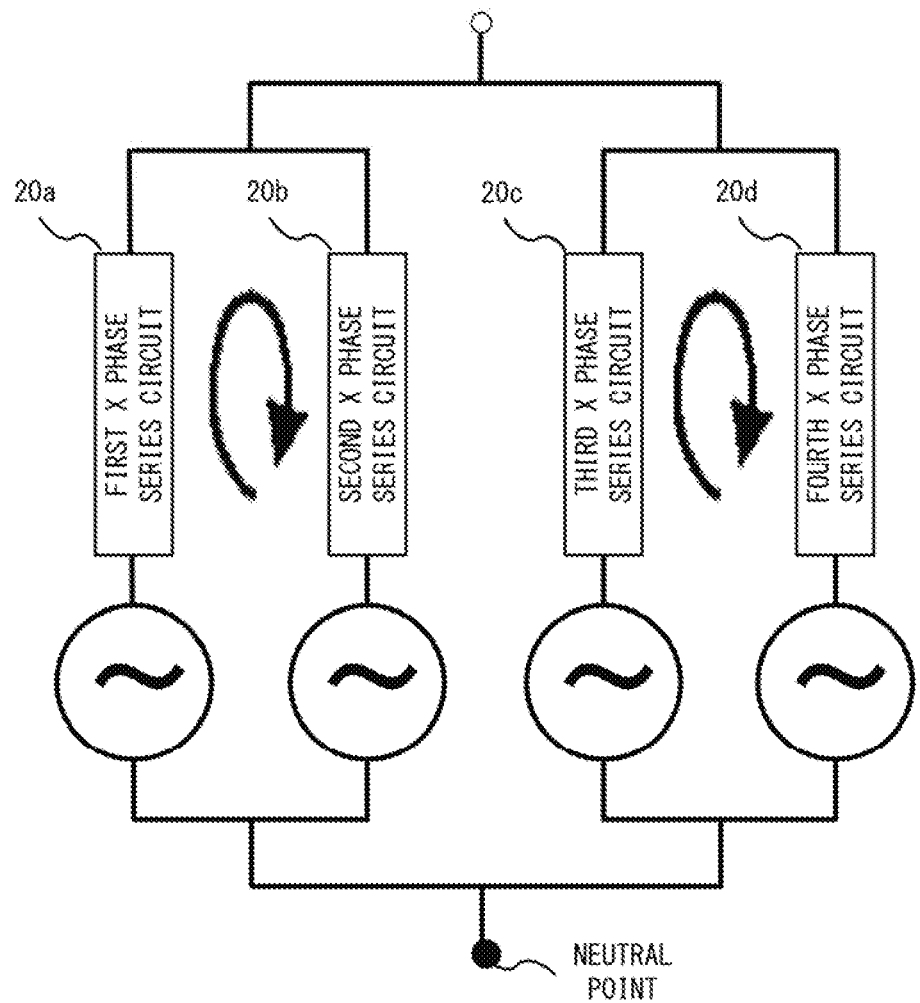
FIG. 8 is a third illustration which represents the simplified structure of the armature winding wire U phase:V phase:W phase in accordance with Embodiment of the present invention.

FIG. 8 is a drawing which represents the simplified structure of the armature winding wire in accordance with Embodiment of the present invention. Each of the armature winding wires (U phase:V phase:W phase) is provided with a four row parallel winding wire structure. The four row parallel winding wire structure is composed of a first X phase series circuit 20a, a second X phase series circuit 20b, a third X phase series circuit 20c, and a fourth X phase series circuit 20d. Here, X phase represents any one of U phase, V phase, and W phase. Minus side terminals (a U phase− terminal, a V phase−terminal, and a W phase−terminal) are connected to the neutral point. Plus side terminals (a U phase+terminal, a V phase+terminal, and a W phase+terminal) are connected to the electric power system. If voltages which are generated in these parallel connected circuits are different among the circuits, a circulating current will flow so that these voltage differences may become 0. Heat which is generated by this circulating current will produce the temperature rise in the coil, the decline in the energy efficiency, and the like. The armature winding wire in accordance with Embodiment of the present invention is applied with a special wire connection structure, in order to reduce a circulating current.

Figure 9:
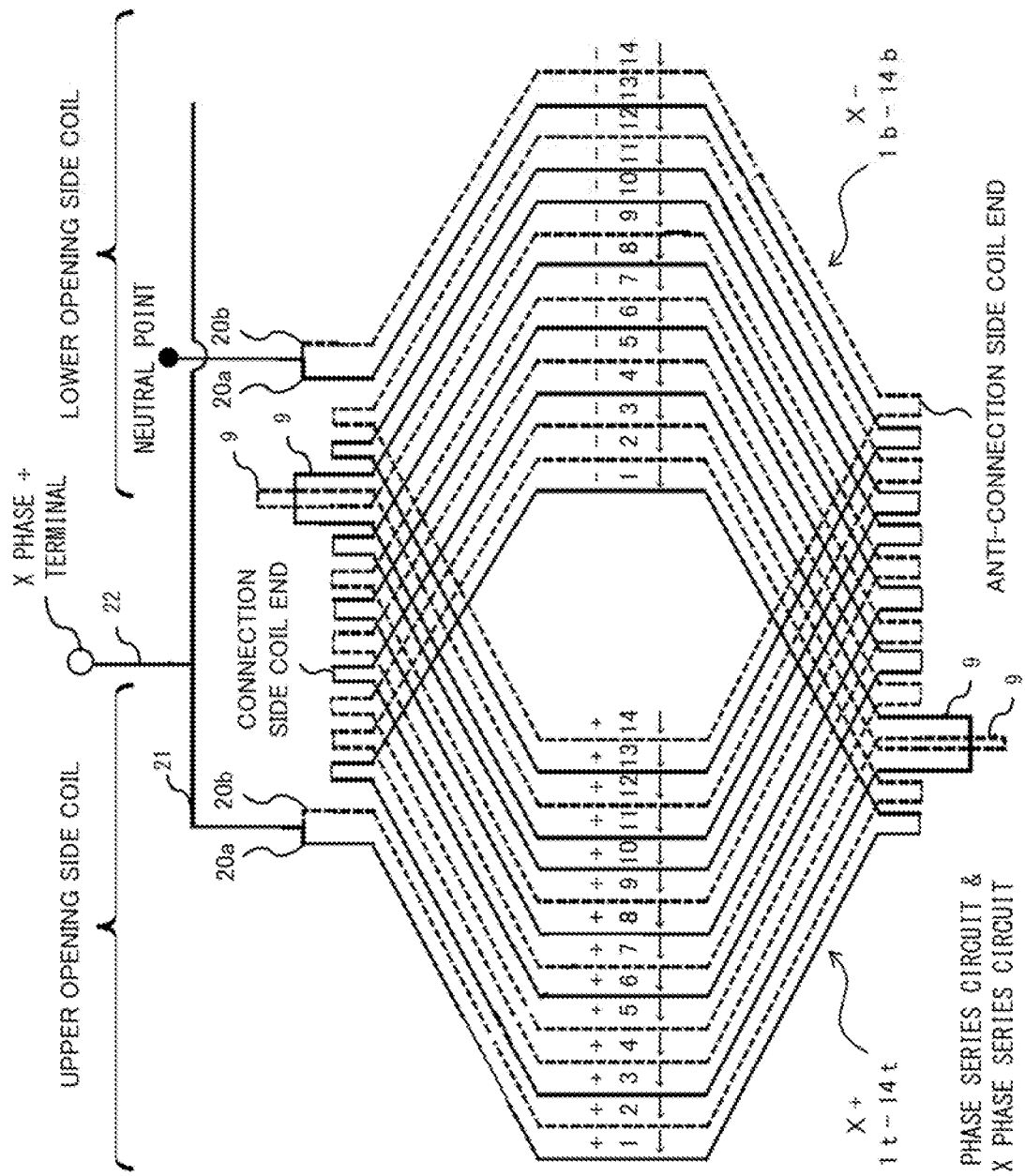
FIG. 9 is an illustration which represents the structure of a first X phase series circuit and a second X phase series circuit, in accordance with Embodiment of the present invention.

FIG. 9 is a drawing which represents the structure of the first X phase series circuit and the second X phase series circuit, in accordance with Embodiment of the present invention. In the drawing, X phase represents any one of U phase, V phase, and W phase. The first X phase series circuit 20a and the second X phase series circuit 20b are composed of a conductor X+1t to a conductor X+14t and a conductor X−1b to a conductor X−14b. In the first X phase series circuit 20a and the second X phase series circuit 20b, twenty eight conductors are connected by the wire connection method for reducing a circulating current. Each of the conductors has coil end, and a coil end on the upper side in the drawing will be referred to as a connection side coil end and a coil end on the lower side in the drawing will be referred to as an anti-connection side coil end. A lead wire 21, which is pulled out from the first X phase series circuit 20a and the second X phase series circuit 20b, is connected, with a lead out wire 22, at a X phase+terminal or a neutral point.

It is determined that the positions of upper opening side coils and lower opening side coils in one phase belt will be represented by the positional number which is counted from the plus terminal side toward the neutral point side. In the first X phase series circuit 20a which is shown by the solid line, the first, the third, the sixth, the eighth, the tenth, the eleventh, and the thirteenth upper opening side coils are connected in sequence. Further, the first, the fourth, the sixth, the eighth, the tenth, the eleventh, and the thirteenth lower opening side coils are connected in sequence. In the second X phase series circuit 20b which is shown by the dotted line, the second, the fourth, the fifth, the seventh, the ninth, the twelfth, and the fourteenth upper opening side coils are connected in sequence. Further, the second, the third, the fifth, the seventh, the ninth, the twelfth, and the fourteenth lower opening side coils are connected in sequence.

Owing to the above configuration, in the first X phase series circuit 20a, conductors are connected in the order of a conductor X+1t, a conductor X−1b, a conductor X+3t, a conductor X−4b, a conductor X+6t, a conductor X−6b, a conductor X+8t, a conductor X−8b, a conductor X+10t, a conductor X−10b, a conductor X+11t, a conductor X−11b, a conductor X+13t, and a conductor X−13b. Further, in the second X phase series circuit 20b, conductors are connected in the order of a conductor X+2t, a conductor X−2b, a conductor X+4t, a conductor X−3b, a conductor X+5t, a conductor X−5b, a conductor X+7t, a conductor X−7b, a conductor X+9t, a conductor X−9b, a conductor X+12t, a conductor X−12b, a conductor X+14t, and a conductor X−14b.

It is to be noted that, in the second X phase series circuit 20b, the conductor X−9b and the conductor X+12t cross at a connection side coil end, and a jumper line 9 is used to connect those connectors. Thereby, in the first X phase series circuit 20a, a jumper line 9 is used to connect the conductor X−10b and the conductor X+11t at the connection side coil end. Further, in the second X phase series circuit 20b, the conductor X+4t and the conductor X−3b cross at an anti-connection side coil end, and a jumper line 9 is used to connect those conductors. Thereby, in the first X phase series circuit 20a, a jumper line 9 is used to connect the conductor X+3t and the conductor X−4b at the anti-connection side coil end. Only two installation sites of the jumper line were enough per phase belt to finish the connection of conductors.

Attachment of a jumper line requires complicated engineering work and a big installing space. According to the wire connection method in accordance with Embodiment of the present invention, the interference of a jumper line and a lead wire can be avoided, since the connection point of the jumper line is away from the lead wire 21.

Figure 10:
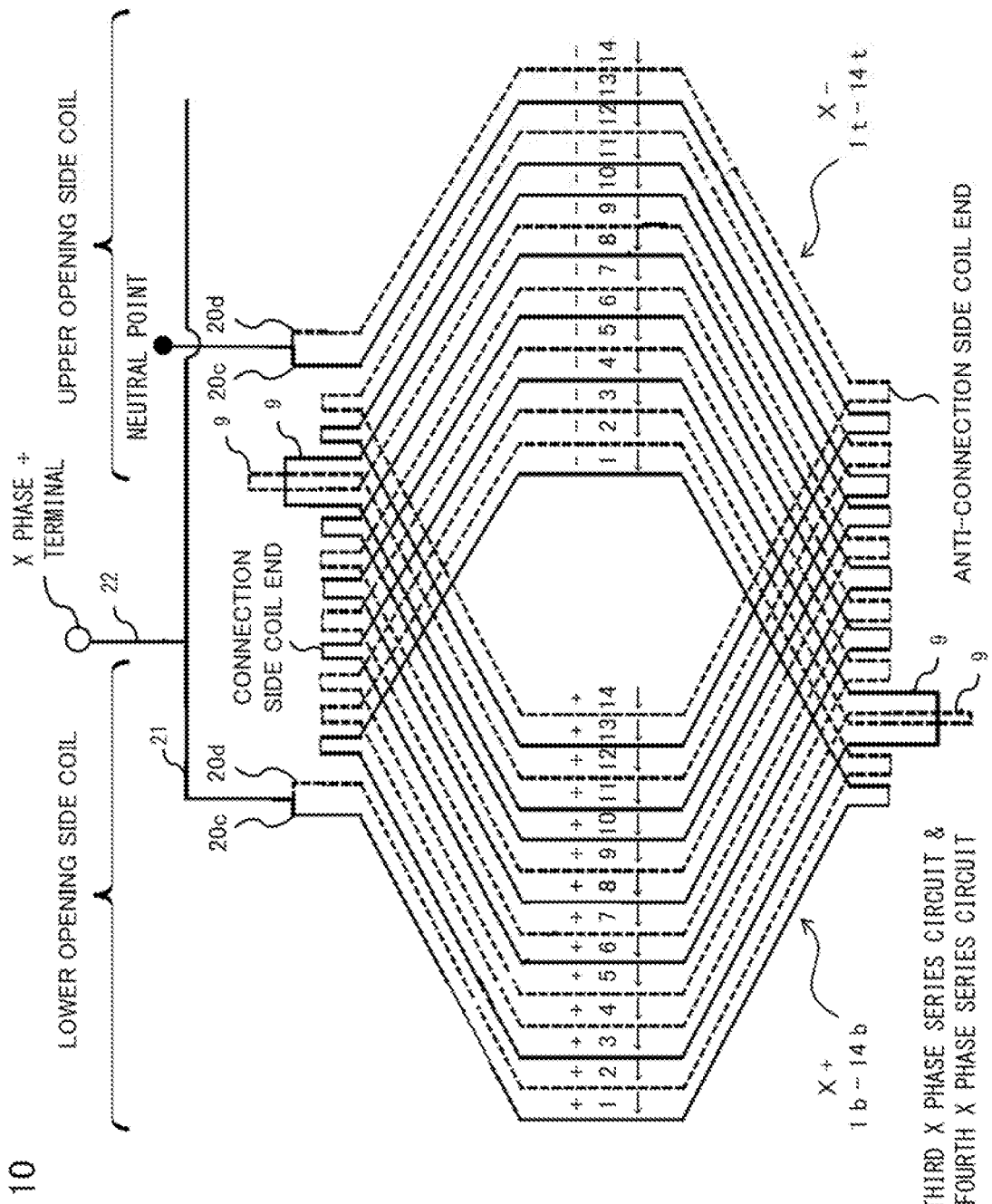
FIG. 10 is an illustration which represents the structure of a third X phase series circuit and a fourth X phase series circuit, in accordance with Embodiment of the present invention

FIG. 10 is a drawing which represents the structure of a third X phase series circuit and a fourth X phase series circuit, in accordance with Embodiment of the present invention. In the drawing, X phase represents any one of U phase, V phase, and W phase. The third X phase series circuit 20c and the fourth X phase series circuit 20d are composed of a conductor X+1b to a conductor X+14b and a conductor X−1t to a conductor X−14t. In the first X phase series circuit 20a and the second X phase series circuit 20b, twenty eight conductors are connected by the wire connection method for reducing a circulating current. Each of the conductors has a coil end, and a coil end on the upper side in the drawing will be referred to as a connection side coil end and a coil end on the lower side in the drawing will be referred to as an anti-connection side coil end. A lead wire 21, which is pulled out from the third X phase series circuit 20c and the fourth X phase series circuit 20d, is connected with a lead out wire 22, at a X phase+terminal or a neutral point.

It is determined that the positions of upper opening side coils and lower opening side coils in one phase belt will be represented by the positional number which is counted from the plus terminal side toward the neutral point side. In the third X phase series circuit 20c which is shown by a solid line, the first, the third, the sixth, the eighth, the tenth, the eleventh, and the thirteenth upper opening side coils are connected in sequence. Further, the first, the fourth, the sixth, the eighth, the tenth, the eleventh, and the thirteenth lower opening side coils are connected in sequence. In the fourth X phase series circuit 20d which is shown by a dotted line, the second, the fourth, the fifth, the seventh, the ninth, the twelfth, and the fourteenth upper opening side coils are connected in sequence. Further, the second, the third, the fifth, the seventh, the ninth, the twelfth, and the fourteenth lower opening side coils are connected in sequence.

According the above configuration, in the third X phase series circuit 20c, conductors are connected in the order of a conductor X+1b, a conductor X−1t, a conductor X+3b, a conductor X−4t, a conductor X+6b, a conductor X−6t, a conductor X+8b, a conductor X−8t, a conductor X+10b, a conductor X−10t, a conductor X+11b, a conductor X−11t, a conductor X+13b, and a conductor X−13t. Further, in the fourth X phase series circuit 20d, conductors are connected in the order of a conductor X+2b, a conductor X−2t, a conductor X+4b, a conductor X−3t, a conductor X+5b, a conductor X−5t, a conductor X+7b, a conductor X−7t, a conductor X+9b, a conductor X−9t, a conductor X+12b, a conductor X−12t, a conductor X+14b, and a conductor X−14t.

It is to be noted that, in the fourth X phase series circuit 20d, the conductor X−9t and the conductor X+12b cross at the connection side coil end, and a jumper line 9 is used to connect those conductors. Thereby, in the third X phase series circuit 20c, a jumper line 9 is used to connect the conductor X−10t and the conductor X+11b at the connection side coil end. Further, in the fourth X phase series circuit 20d, the conductor X+4b and the conductor X−3t cross at the anti-connection side coil end, a jumper line 9 is used to connect those conductors. Thereby, in the third X phase series circuit 20c, a jumper line 9 is used to connect the conductor X+3b and the conductor X−4t at the anti-connection side coil end. Only two installation sites of the jumper line were enough per phase belt to finish the connection of conductors. Attachment of a jumper line requires complicated engineering work and a big installing space. According to the wire connection method in accordance with Embodiment of the present invention, the interference of a jumper line and a lead wire can be avoided, since the connection point of the jumper line is away from the lead wire 21.

Figure 11:
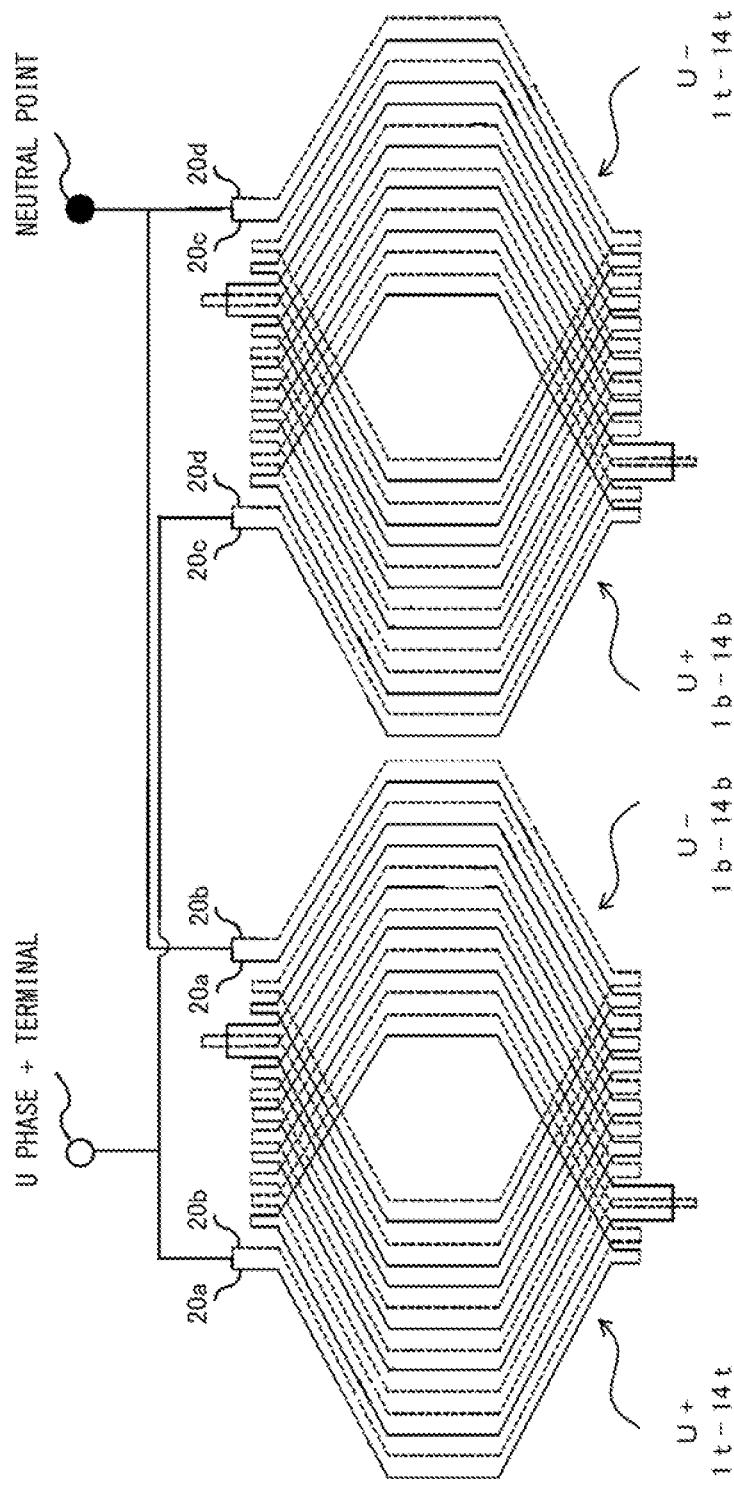
FIG. 11 is an illustration which represents the simplified structure of a U phase armature winding wire in accordance with Embodiment of the present invention.

FIG. 11 is a drawing which represents a simplified structure of a U phase armature winding wire in accordance with Embodiment of the present invention. The U phase armature winding wire is provided with a four row parallel winding wire structure. The first U phase series circuit 20*a* and the second U phase series circuit 20*b* are composed of a conductor U+1t to a conductor U+14t and a conductor U−1b to a conductor U−14b. The third U phase series circuit 20*c* and the fourth U phase series circuit 20*d* are composed of a conductor U+1b to a conductor U+14b and a conductor U−1t to a conductor U−14t. The first U phase series circuit 20*a*, the second U phase series circuit 20*b*, the third U phase series circuit 20*c*, and the fourth U phase series circuit 20*d* are provided with the four row parallel winding wire structure.

Figure 12:
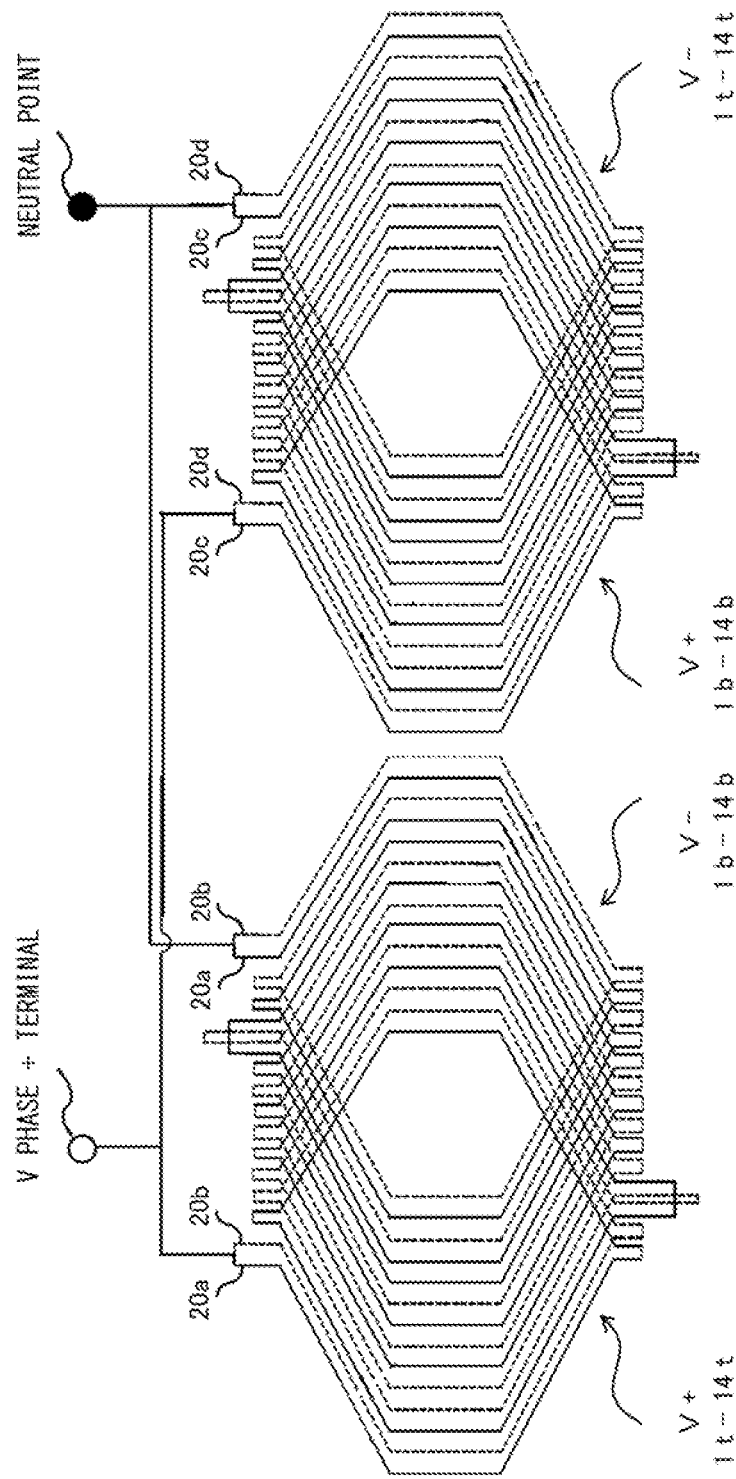
FIG. 12 is an illustration which represents the simplified structure of a V phase armature winding wire in accordance with Embodiment of the present invention.

FIG. 12 is a drawing which represents the simplified structure of a V phase armature winding wire in accordance with Embodiment of the present invention. The V phase armature winding wire is provided with a four row parallel winding wire structure. The first V phase series circuit 20*a* and the second V phase series circuit 20*b* are composed of a conductor V+1t to a conductor V+14t and a conductor V−1b to a conductor V−14b. The third V phase series circuit 20*c* and the fourth V phase series circuit 20*d* are composed of a conductor V+1b to a conductor V+14b and a conductor V−1t to a conductor V−14t. The first V phase series circuit 20*a*, the second V phase series circuit 20*b*, the third V phase series circuit 20*c*, and the fourth V phase series circuit 20*d* are provided with the four row parallel winding wire structure.

Figure 13:
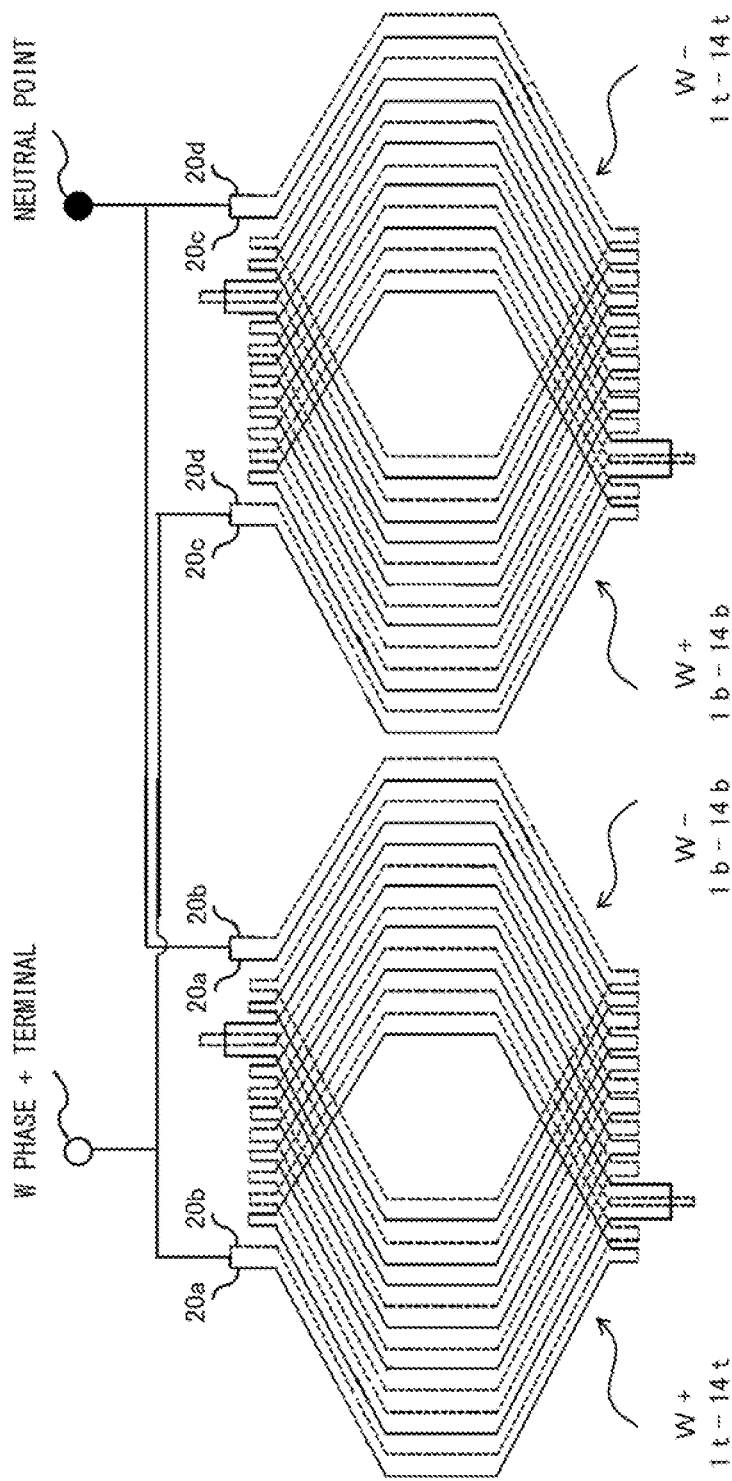
FIG. 13 is an illustration which represents the simplified structure of a W phase armature winding wire in accordance with Embodiment of the present invention.

FIG. 13 is a drawing which represents the simplified structure of a W phase armature winding wire in accordance with Embodiment of the present invention. The W phase armature winding wire is provided with a four row parallel winding wire structure. The first W phase series circuit 20*a* and the second W phase series circuit 20*b* are compose of a conductor W+1t to a conductor W+14t and a conductor W−1b to a conductor W−14b. The third W phase series circuit 20*c* and the fourth W phase series circuit 20*d* are composed of a conductor W+1b to a conductor W+14b and a conductor W−1t to a conductor W−14t. The first W phase series circuit 20*a*, the second W phase series circuit 20*b*, the third W phase series circuit 20*c*, and the fourth W phase series circuit 20*d* are provided with the four row parallel winding wire structure.

Figure 14:
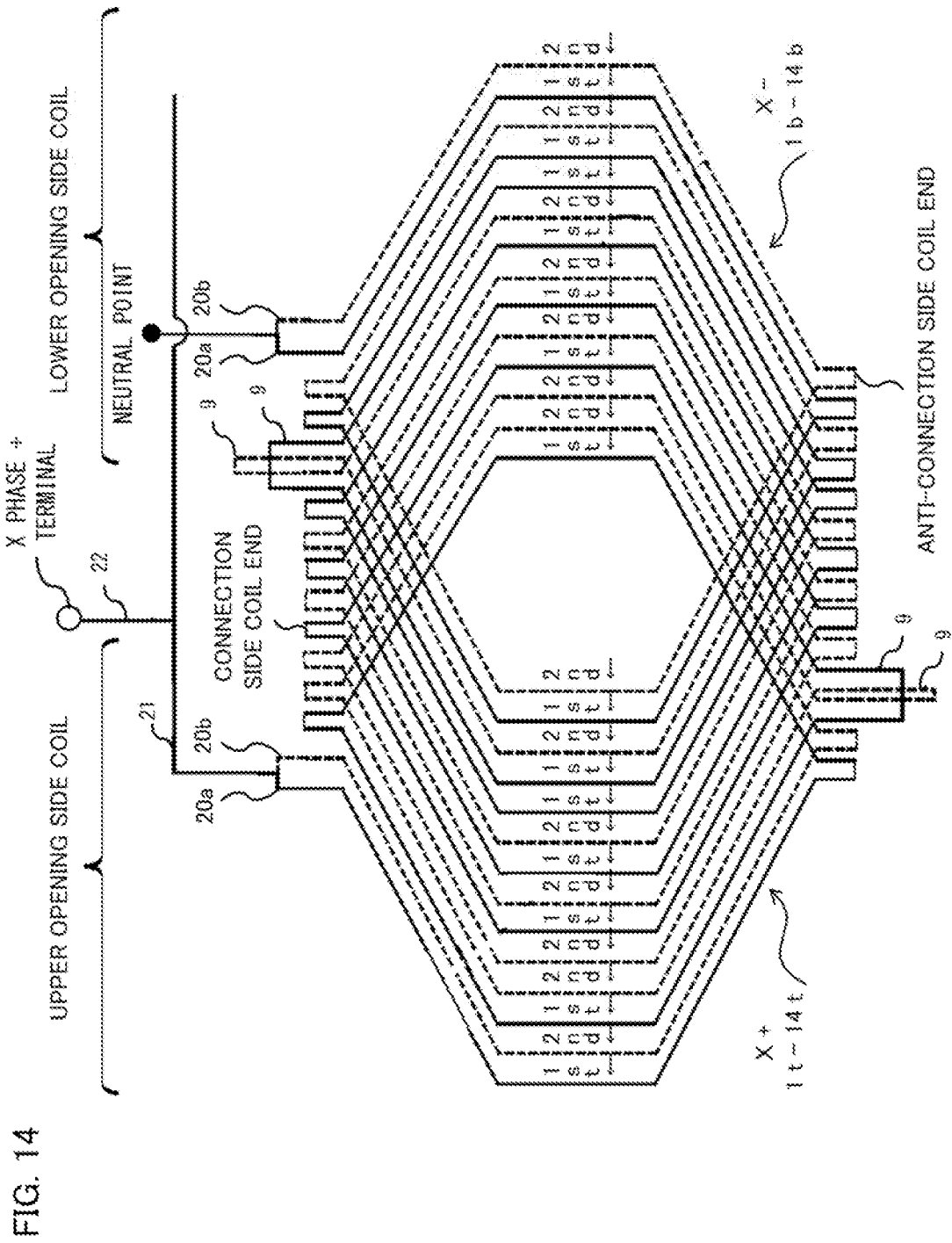
FIG. 14 is an illustration which represents the structure of a first X phase series circuit and a second X phase series circuit, in accordance with Embodiment of the present invention.

FIG. 14 is a drawing which represents the structure of a first X phase series circuit and a second X phase series circuit in accordance with Embodiment of the present invention. Here, X phase represents any one of U phase, V phase, and W phase. In the drawing, "1st" and "2nd" represent a first X phase series circuit and a second X phase series circuit, respectively. The first X phase series circuit 20*a* and the second X phase series circuit 20*b* are composed of a conductor X+1t to a conductor X+14t and a conductor X−1b to a conductor X−14b. In the first X phase series circuit 20*a* and the second X phase series circuit 20*b*, twenty eight conductors are connected by the wire connection method for reducing a circulating current. Each of the conductors has a coil end, and a coil end on the upper side in the drawing will be referred to as a connection side coil end and a coil end on the lower side in the drawing will be referred to as an anti-connection side coil end. A lead wire 21, which is pulled out from the first X phase series circuit 20*a* and the second X phase series circuit 20*b*, is connected with a lead out wire 22, at a X phase+terminal or a neutral point.

The rotary electric machine in accordance with Embodiment of the present invention has a rotor of two poles, eighty four slots, and a three phase armature winding wire. An upper opening side coil is stored on the inside diameter side of a slot, and a lower opening side coil is stored on the outer diameter side of a slot. The upper opening side coil and the lower opening side coil are connected to form a three phase armature winding wire. This armature winding wire has two phase belts (a plus phase belt and a minus phase belt) per phase. The phase belt includes two series circuits, and the center of the phase belts is set at the circumferential direction averaged position of all of the upper opening side coils and the lower opening side coils which constitute the phase belt.

Here, when the arrangement of a first X phase series circuit and a second X phase series circuit at least in one phase belt is viewed from the center of a phase belt in a closer sequence, the upper opening side coils are disposed in sequence to follow a first X phase series circuit, a second X phase series circuit, a first X phase series circuit, s second X phase series circuit, a second X phase series circuit, a first X phase series circuit, a second X phase series circuit, a first X phase series circuit, a second X phase series circuit, a first X phase series circuit, a first X phase series circuit, a second X phase series circuit, a first X phase series circuit, and a second X phase series circuit.

Further, the lower opening side coils which will be connected with the upper opening side coils are disposed in the order of a first X phase series circuit, a second X phase series circuit, a second X phase series circuit, a first X phase series circuit, a second X phase series circuit, a first X phase series circuit, a second X phase series circuit, a first X phase series circuit, a second X phase series circuit, a first X phase series circuit, a second X phase series circuit, a first X phase series circuit, a first X phase series circuit, a second X phase series circuit, a first X phase series circuit, and a second X phase series circuit.

It is to be noted that, in the second X phase series circuit 20*b*, the conductor X−9b and the conductor X+12t cross at the connection side coil end, and a jumper line 9 is used to connect those conductors. Thereby, in the first X phase series circuit 20*a*, a jumper line 9 is used to connect the conductor X−10b and the conductor X+11t at the connection side coil end. Further, in the second X phase series circuit 20*b*, the conductor X+4t and the conductor X−3b cross at the anti-connection side coil end, and a jumper line 9 is used to connect those conductors. Thereby, in the first X phase series circuit 20*a*, a jumper line 9 is used to connect the conductor X+3t and the conductor X−4b at the anti-connection side coil end. Only two installation sites of the jumper line were enough per phase belt to finish the connection of conductors. Attachment of a jumper line requires complicated engineering work and a big installing space. According to the wire connection method in accordance with Embodiment of the present invention, the interference of a jumper line and a lead wire can be avoided, since the connection point of the jumper line is away from the lead wire 21.

Figure 15:
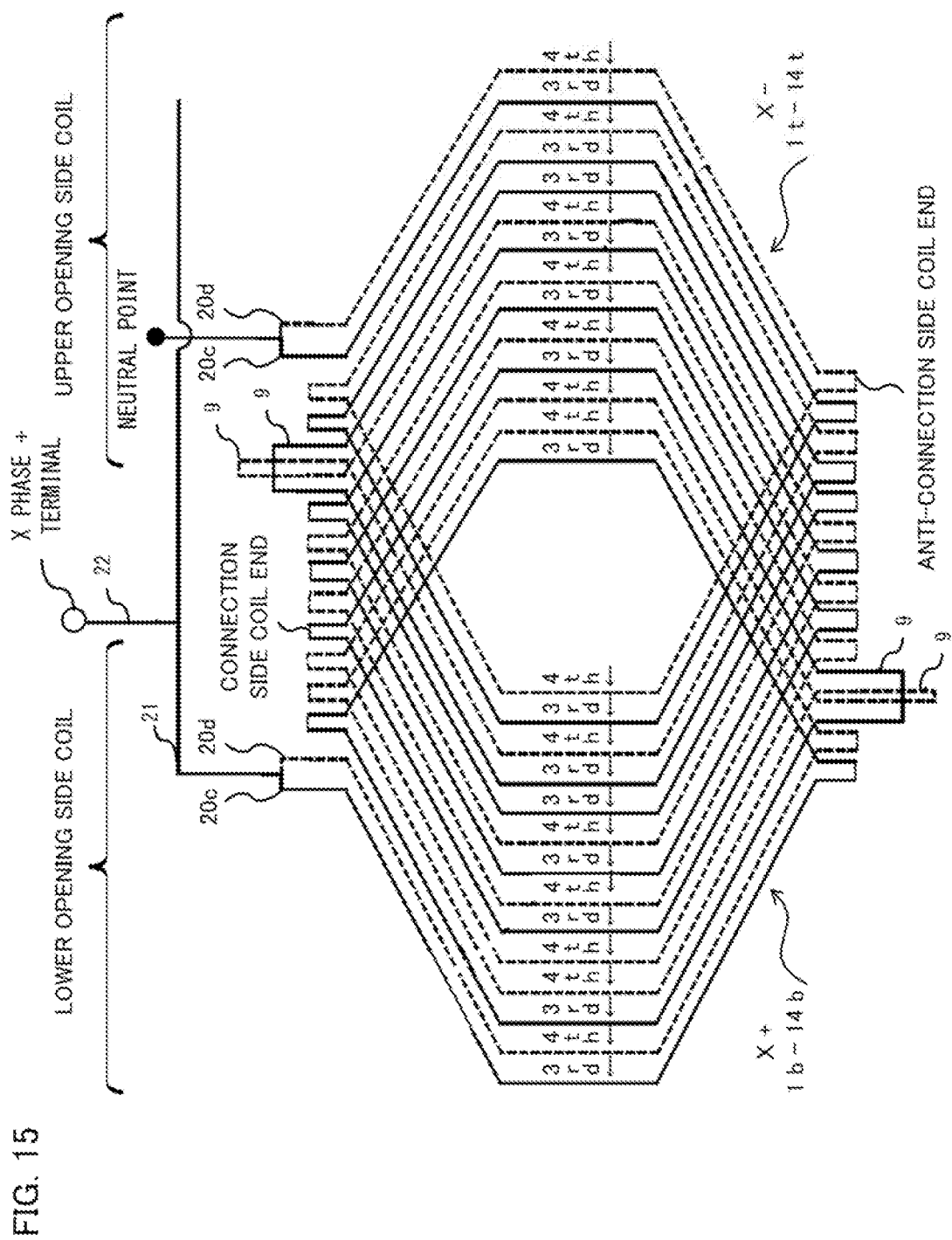
FIG. 15 is an illustration which represents the structure of a third X phase series circuit and a fourth X phase series circuit, in accordance with Embodiment of the present invention.

FIG. 15 is a drawing which represents the structure of a third X phase series circuit and a fourth X phase series circuit in accordance with Embodiment of the present invention. Here, X phase represents any one of U phase, V phase, and W phase. In the drawing, "3rd" and "4th" represent a third X phase series circuit and a fourth X phase series circuit, respectively. The third X phase series circuit 20*c* and the fourth X phase series circuit 20*d* are composed of a conductor X+1b to a conductor X+14b and a conductor X−1t to a conductor X−14t. In the third X phase series circuit 20*c* and the fourth X phase series circuit 20*d*, twenty eight conductors are connected by the wire connection method for reducing a circulating current. Each of the conductors has a coil end, and a coil end on the upper side in the drawing will be referred to as a connection side coil end and a coil end on the lower side in the drawing will be referred to as an anti-connection side coil end. A lead wire 21, which is pulled out from the third X phase series circuit 20*c* and the fourth X phase series circuit 20*d*, is connected with a lead out wire 22, at a X phase+terminal or a neutral point.

The rotary electric machine in accordance with Embodiment of the present invention has a rotor of two poles, eighty four slots, and a three phase armature winding wire. An upper opening side coil is stored on the inside diameter side of a slot, and a lower opening side coil is stored on the outer diameter side of a slot. The upper opening side coil and the lower opening side coil are connected to form a three phase armature winding wire. This armature winding wire has two phase belts (a plus phase belt and a minus phase belt) per phase. The phase belt includes two series circuits, and the center of the phase belts is set at the circumferential directional averaged position of all of the upper opening side coils and the lower opening side coils which constitute the phase belt.

Here, when the arrangement of a third X phase series circuit and a fourth X phase series circuit at least in one phase belt is viewed from the center of a phase belt in the closer sequence, the upper opening side coils are disposed in the order of a third X phase series circuit, a fourth X phase series circuit, a third X phase series circuit, a fourth X phase series circuit, a fourth X phase series circuit, a third X phase series circuit, a fourth X phase series circuit, a third X phase series circuit, a fourth X phase series circuit, a third X phase series circuit, a fourth X phase series circuit, a third X phase series circuit, a fourth X phase series circuit, a third X phase series circuit, and a fourth X phase series circuit.

The lower opening side coils which will be connected with the upper opening side coils are disposed in the order of a third X phase series circuit, a fourth X phase series circuit, a fourth X phase series circuit, a third X phase series circuit, a fourth X phase series circuit, a third X phase series circuit, a fourth X phase series circuit, a third X phase series circuit, a fourth X phase series circuit, a third X phase series circuit, a third X phase series circuit, a fourth X phase series circuit, a third X phase series circuit, and a fourth X phase series circuit.

It is to be noted that, in the fourth X phase series circuit 20*d*, the conductor X−9t and the conductor X+12b cross at the connection side coil end, and a jumper line 9 is used to connect those conductors. Thereby, in the third X phase series circuit 20*c*, a jumper line 9 is used to connect the conductor X−10t and the conductor X+11b at the connection side coil end. Further, in the fourth X phase series circuit 20*d*, the conductor X+4b and the conductor X−3t cross at the anti-connection side coil end, and a jumper line 9 is used to connect those conductors. Thereby, in the third X phase series circuit 20*c*, a jumper line 9 is used to connect the conductor X+3b and the conductor X−4t at the anti-connection side coil end. Only two installation sites of the jumper line were enough per phase belt to finish the connection of conductors. Attachment of a jumper line requires complicated engineering work and a big installing space. According to the wire connection method in accordance with Embodiment of the present invention, the interference of a jumper line and a lead wire can be avoided, since the connection point of the jumper line is away from the lead wire 21.

Figure 16:
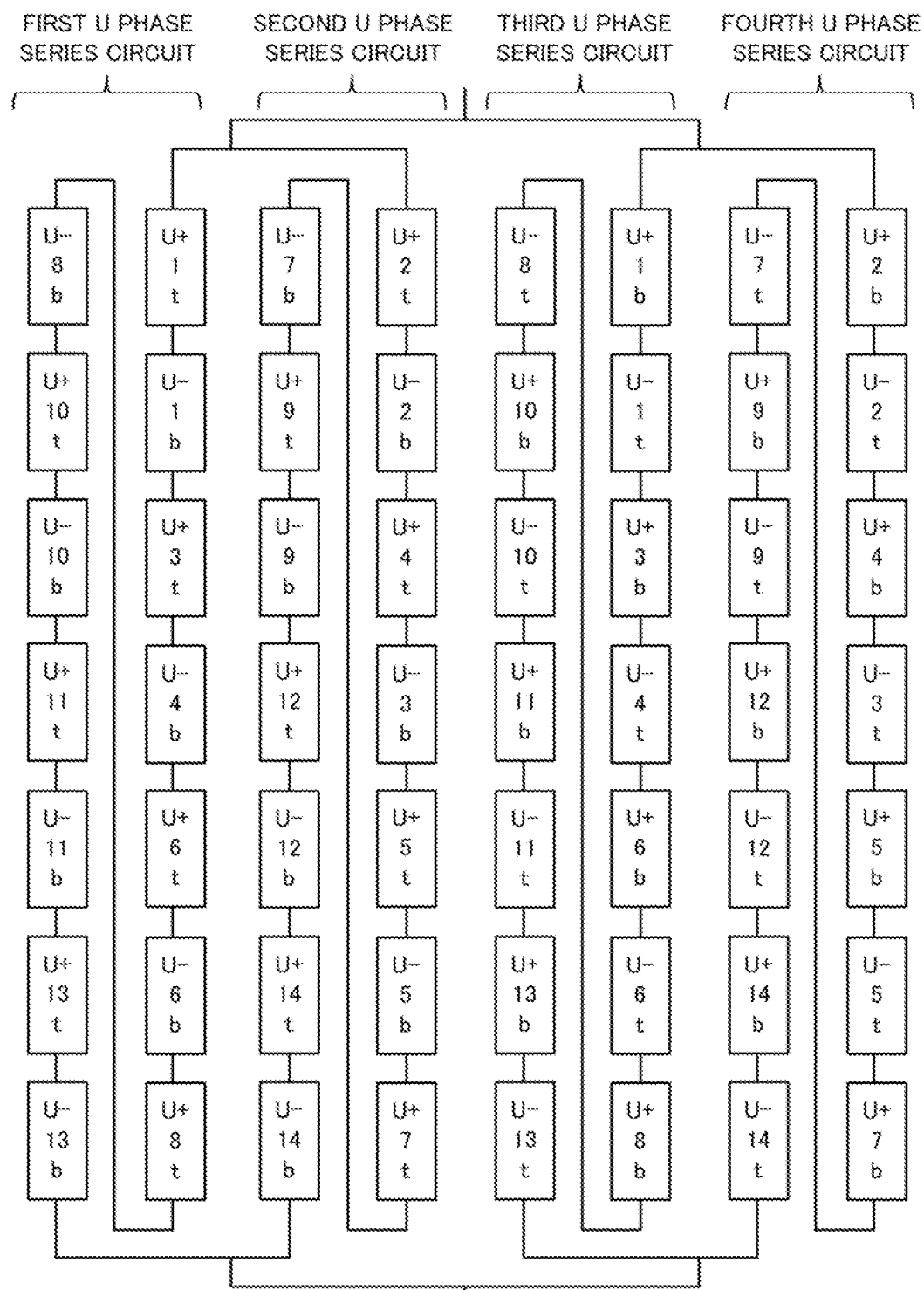
FIG. 16 is an illustration which represents the specific wiring structure of the U phase armature winding wire in accordance with Embodiment of the present invention.

FIG. 16 is a drawing which represents the specific wiring structure of a U phase armature winding wire in accordance with Embodiment of the present invention. The first U phase series circuit 20*a* and the second U phase series circuit 20*b* are composed of a conductor U+1t to a conductor U+14t and a conductor U−1b to a conductor U−14b. In the first U phase series circuit 20*a*, the conductor U+1t is connected at the anti-connection side coil end with the conductor U−1b. The conductor U−1b is connected at the connection side coil end with the conductor U+3t. The conductor U+3t is connected at the anti-connection side coil end with the conductor U−4b. The conductor U−4b is connected at the connection side coil end with the conductor U+6t. The conductor U+6t is connected at the anti-connection side coil end with the conductor U−6b. The conductor U−6b is connected at the connection side coil end with the conductor U+8t.

The conductor U+8t is connected at the anti-connection side coil end with the conductor U−8b. The conductor U−8b is connected at the connection side coil end with the conductor U+10t. The conductor U+10t is connected at the anti-connection side coil end with the conductor U−10b. The conductor U−10b is connected at the connection side coil end with the conductor U+11t. The conductor U+11t is connected at the anti-connection side coil end with the conductor U−11b. The conductor U−11b is connected at the connection side coil end with the conductor U+13t. The conductor U+13t is connected at the anti-connection side coil end with the conductor U−13b.

In the second U phase series circuit 20*b*, the conductor U+2t is connected at the anti-connection side coil end with the conductor U−2b. The conductor U−2b is connected at the connection side coil end with the conductor U+4t. The conductor U+4t is connected at the anti-connection side coil end with the conductor U−3b. The conductor U−3b is connected at the connection side coil end with the conductor U+5t. The conductor U+5t is connected at the anti-connection side coil end with the conductor U−5b. The conductor U−5b is connected at the connection side coil end with the conductor U+7t. The conductor U+7t is connected at the anti-connection side coil end with the conductor U−7b.

The conductor U−7b is connected at the connection side coil end with the conductor U+9t. The conductor U+9t is connected at the anti-connection side coil end with the conductor U−9b. The conductor U−9b is connected at the connection side coil end with the conductor U+12t. The conductor U+12t is connected at the anti-connection side coil end with the conductor U−12b. The conductor U−12b is connected at the connection side coil end with the conductor U+14t. The conductor U+14t is connected at the anti-connection side coil end with the conductor U−14b.

In the third U phase series circuit 20*c*, the conductor U+1b is connected at the anti-connection side coil end with the conductor U−1t. The conductor U−1t is connected at the connection side coil end with the conductor U+3b. The conductor U+3b is connected at the anti-connection side coil end with the conductor U−4t. The conductor U−4t is connected at the connection side coil end with the conductor U+b. The conductor U+6b is connected at the anti-connection side coil end with the conductor U−6t. The conductor U−6t is connected at the connection side coil end with the conductor U+8b.

The conductor U+8b is connected at the anti-connection side coil end with the conductor U−8t. The conductor U−8t is connected at the connection side coil end with the conductor U+10b. The conductor U+10b is connected at the anti-connection side coil end with the conductor U−10t. The conductor U−10t is connected at the connection side coil end with the conductor U+11b. The conductor U+11b is connected at the anti-connection side coil end with the conductor U−11t. The conductor U−11t is connected at the connection side coil end with the conductor U+13b. The conductor U+13b is connected at the anti-connection side coil end with the conductor U−13t.

In the fourth U phase series circuit 20d, the conductor U+2b is connected at the anti-connection side coil end with the conductor U−2t. The conductor U−2t is connected at the connection side coil end with the conductor U+4b. The conductor U+4b is connected at the anti-connection side coil end with the conductor U−3t. The conductor U−3t is connected at the connection side coil end with the conductor U+5b. The conductor U+5b is connected at the anti-connection side coil end with the conductor U−5t. The conductor U−5t is connected with the connection side coil end with the conductor U+7b. The conductor U+7b is connected at the anti-connection side coil end with the conductor U−7t.

The conductor U−7t is connected at the connection side coil end with the conductor U+9b. The conductor U+9b is connected at the anti-connection side coil end with the conductor U−9t. The conductor U−9t is connected at the connection side coil end with the conductor U+12b. The conductor U+12b is connected at the anti-connection side coil end with the conductor U−12t. The conductor U−12t is connected at the connection side coil end with the conductor U+14b. The conductor U+14b is connected at the anti-connection side coil end with the conductor U−14t.

Figure 17:
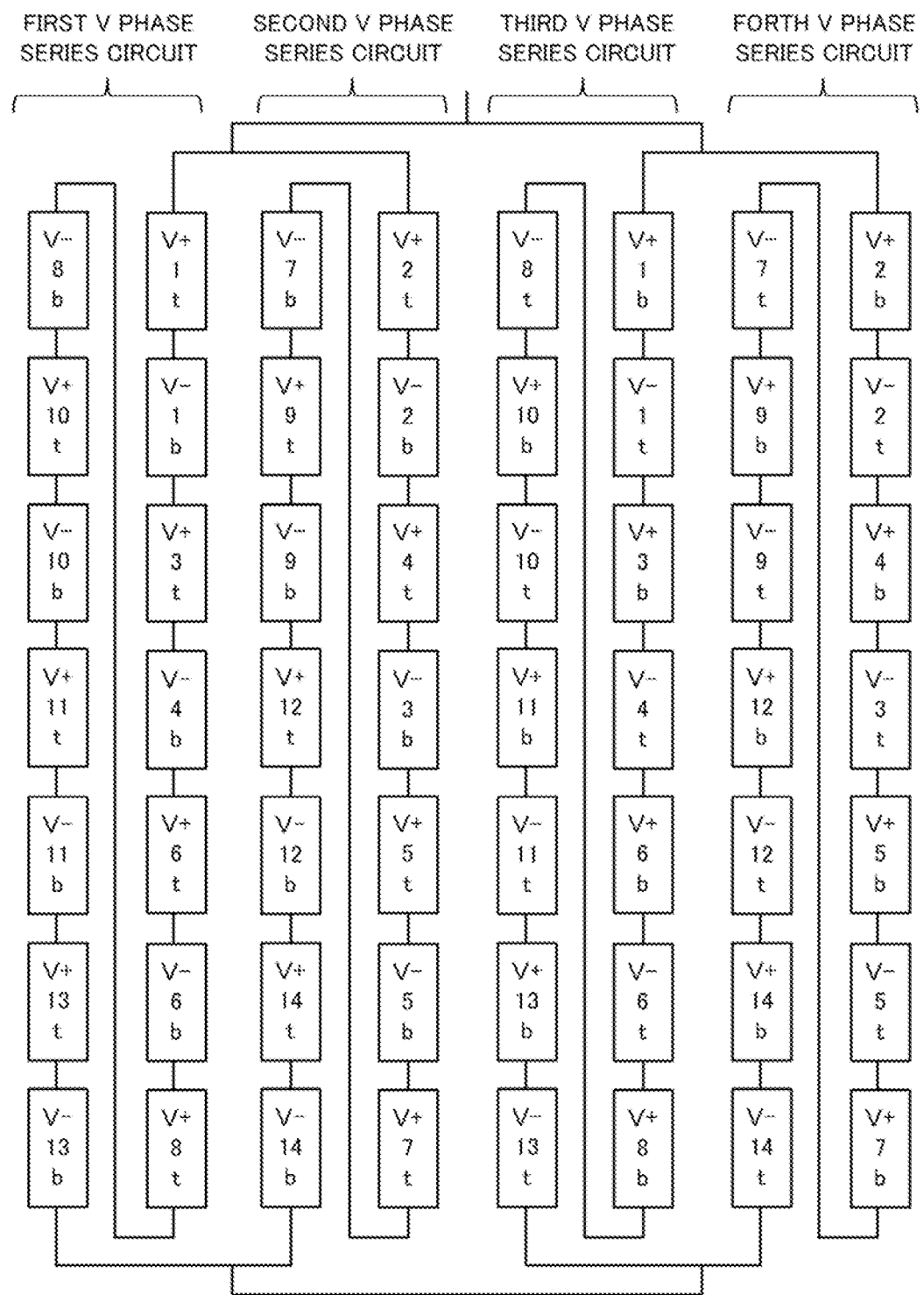
FIG. 17 is an illustration which represents the specific wiring structure of the V phase armature winding wire in accordance with Embodiment of the present invention.

FIG. 17 is a drawing which represents a specific wiring structure of a V phase armature winding wire in accordance with Embodiment of the present invention. The first V phase series circuit 20a and the second V phase series circuit 20b are composed of a conductor V+1t to a conductor V+14t and a conductor V−1b to a conductor V−14b. The third V phase series circuit 20c and the fourth V phase series circuit 20d are composed of a conductor V+1b to a conductor V+14b and a conductor V−1t to a conductor V−14t.

In the first V phase series circuit, conductors are connected in the order of a conductor V+1t, a conductor V−1b, a conductor V+3t, a conductor V−4b, a conductor V+6t, a conductor V−6b, a conductor V+8t, a conductor V−8b, a conductor V+10t, a conductor V−10b, a conductor V+11t, a conductor V−11b, a conductor V+13t, and a conductor V−13b. In the second V phase series circuit, conductors are connected in the order of a conductor V+2t, a conductor V−2b, a conductor V+4t, a conductor V−3b, a conductor V+5t, a conductor V−5b, a conductor V+7t, a conductor V−7b, a conductor V+9t, a conductor V−9b, a conductor V+12t, a conductor V−12b, a conductor V+14t, and a conductor V−14b.

In the third V phase series circuit, conductors are connected in the order of a conductor V+1b, a conductor V−1t, a conductor V+3b, a conductor V−4t, a conductor V+6b, a conductor V−6t, a conductor V+8b, a conductor V−8t, a conductor V+10b, a conductor V−10t, a conductor V+11b, a conductor V−11t, a conductor V+13b, and a conductor V−13t. In the fourth V phase series circuit, conductors are connected in the order of a conductor V+2b, a conductor V−2t, a conductor V+4b, a conductor V−3t, a conductor V+5b, a conductor V−5t, a conductor V+7b, a conductor V−7t, a conductor V+9b, a conductor V−9t, a conductor V+12b, a conductor V−12t, a conductor V+14b, and a conductor V−14t.

Figure 18:
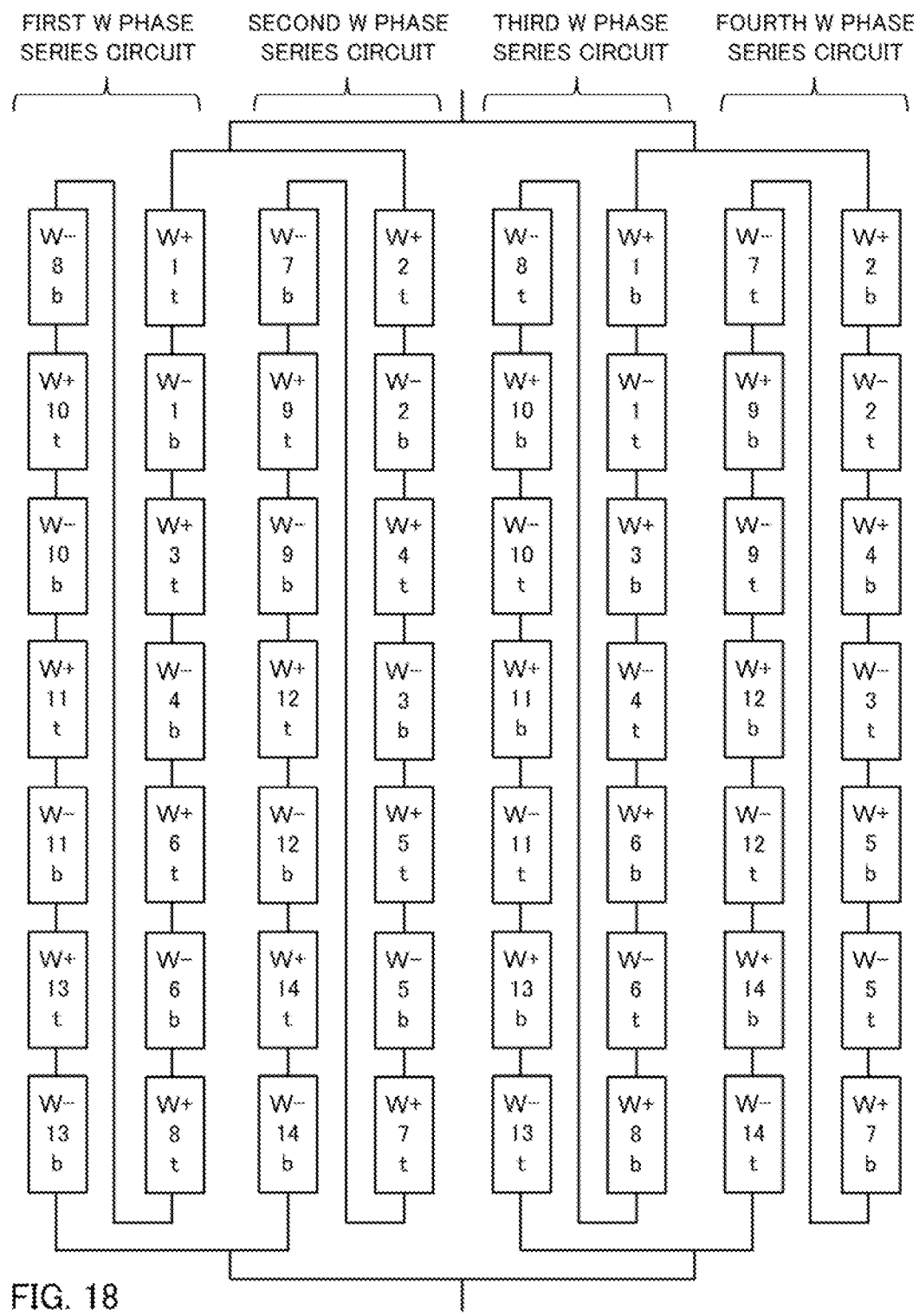
FIG. 18 is an illustration represent the specific wiring structure of the W phase armature winding wire in accordance with Embodiment of the present invention.

FIG. 18 is a drawing which represents a specific wiring structure of a W phase armature winding wire in accordance with Embodiment of the present invention. The first W phase series circuit 20a and the second W phase series circuit 20b are composed of a conductor W+1t to a conductor W+14t and a conductor W−1b to a conductor W−14b. The third W phase series circuit 20c and the fourth W phase series circuit 20d are composed of a conductor W+1b to a conductor W+14b and a conductor W−1t to a conductor W−14t.

In the first W phase series circuit, conductors are connected in the order of a conductor W+1t, a conductor W−1b, a conductor W+3t, a conductor W−4b, a conductor W+6t, a conductor W−6b, a conductor W+8t, a conductor W−8b, a conductor W+10t, a conductor W−10b, a conductor W+11t, a conductor W−11b, a conductor W+13t, and a conductor W−13b. In the second W phase series circuit, conductors are connected in the order of a conductor W+2t, a conductor W−2b, a conductor W+4t, a conductor W−3b, a conductor W+5t, a conductor W−5b, a conductor W+7t, a conductor W−7b, a conductor W+9t, a conductor W−9b, a conductor W+12t, a conductor W−12b, a conductor W+14t, and a conductor W−14b.

In the third W phase series circuit, conductors are connected in the order of a conductor W+1b, a conductor W−1t, a conductor W+3b, a conductor W−4t, a conductor W+6b, a conductor W−6t, a conductor W+8b, a conductor W−8t, a conductor W+10b, a conductor W−10t, a conductor W+11b, a conductor W−11t, a conductor W+13b, and a conductor W−13t. In the fourth W phase series circuit, conductors are connected in the order of a conductor W+2b, a conductor W−2t, a conductor W+4b, a conductor W−3t, a conductor W+5b, a conductor W−5t, a conductor W+7b, a conductor W−7t, a conductor W+9b, a conductor W−9t, a conductor W+12b, a conductor W−12t, a conductor W+14b, and a conductor W−14t.

Applying such a configuration as in the example of the present invention, it is possible to finish the connection of conductors with only two jumper lines per phase belt, even in a two pole four parallel connected circuit. Since the number of jumper lines is decreased, the decline in the working efficiency is suppressed and working efficiency is improved. Accordingly, the reduction in the manufacturing cost can be attained. Further, since the connection point of the jumper line is away from the lead wire, the interference of a jumper line and a lead wire can be avoided. Furthermore, since jumper lines are used, the circulating current among the circuits can be suppressed, and burnt to ashes of the winding wire due the excessive heat can be avoided.

That is to say, the rotary electric machine in accordance with the present invention comprises: a rotor which has two poles, and a stator in which eighty four slots are formed, wherein a first coil piece denoted by t and a second coil piece denoted by b are disposed in each slot of the stator;

the first coil piece and the second coil piece both form a six phase belt which consists of a U phase+belt, a U phase−belt, a V phase+belt, a V phase belt, a W phase+belt, and a W phase−belt;

the first coil piece which forms the six phase belt is referred to as a conductor U+nt, a conductor W−nt, a conductor V+nt, a conductor U−nt, a conductor W+nt, a conductor V−nt, where n is used to denote a natural number of 1 to 14;

and the second coil piece is referred to as a conductor U+nb, a conductor W−nb, a conductor V+nb, a conductor U−nb, a conductor W+nb, and a conductor V−nb, where n is used to denote a natural number of 1 to 14;

a conductor U+1t to a conductor U+14t, a conductor U−1b to a conductor U−14b, a conductor U+1b to a conductor U+14b, and a conductor U−1t to a conductor U−14t form a four row parallel winding wire structure of U phase which consists of a first U phase series circuit, a second U phase series circuit, a third U phase series circuit, and a fourth U phase series circuit;

a conductor V+1t to a conductor V+14t, a conductor V−1b to a conductor V−14b, a conductor V+1b to a conductor V+14b, and a conductor V−1t to a conductor V−14t form a four row parallel winding wire structure of V phase which consists of a first V phase series circuit, a second V phase series circuit, a third V phase series circuit, and a fourth V phase series circuit;

a conductor W+1t to a conductor W+14t, a conductor W−1b to a conductor W−14b, a conductor W+1b to a conductor W+14b, and a conductor W−1t to a conductor W−14t form a four row parallel winding wire structure of W phase which consists of a first W phase series circuit, a second W phase series circuit, a third W phase series circuit, and a fourth W phase series circuit;

when X is used to denote any one of U, V, and W, conductors are connected in an order of a conductor X+1t, a conductor X−1b, a conductor X+3t, a conductor X−4b, a conductor X+6t, a conductor X−6b, a conductor X+8t, a conductor X−8b, a conductor X+10t, a conductor X−10b, a conductor X+11t, a conductor X−11b, a conductor X+13t, and a conductor X−13b in the first U phase series circuit, the first V phase series circuit, and the first W phase series circuit; and conductors are connected in an order of a conductor X+2t, a conductor X−2b, a conductor X+4t, a conductor X−3b, a conductor X+5t, a conductor X−5b, a conductor X+7t, a conductor X−7b, a conductor X+9t, a conductor X−9b, and a conductor X+12t, a conductor X−12b, a conductor X+14t, and a conductor X−14b in the second U phase series circuit, the second V phase series circuit, and the second W phase series circuit.

According to the present invention, it is possible to provide a rotary electric machine which is certainly capable of reducing the number of jumper lines and suppressing the circulating current among circuits, and is free from the attached jumper line's influence on the structural design of a lead wire, even if the two pole four parallel winding wire structure is employed in the rotary electric machine.

The present invention relates to a rotary electric machine which has a two pole rotor, eighty four slots, and a three phase armature winding wire, where the winding wire is stored in the slots provided in the layer stacked iron core, and each phase belt of the winding wire consists of two parallel connected circuits. Each of the parallel connected circuits has series coils, and each of the series coils has two coil pieces, an upper coil piece and a lower coil piece, which are each connected at a connection side coil end and an anti-connection side coil end, respectively. In a case in which relative positions of the upper coil pieces and the lower coil pieces within one phase belt are indicated by the position which are counted from a pole center; at a half of the parallel connected circuits among the respective parallel connected circuits, the upper coil pieces and the lower coil pieces which are contained in the same parallel connected circuit are connected so that their positions may follow a 1st, a 3rd, a 6th, an 8th, a 10th, an 11th and a 13th position from the pole center; and at a remaining half of the parallel connected circuits among the respective parallel connected circuits, the upper coil pieces and the lower coil pieces which are contained in the same parallel connected circuit are connected so that their positions may follow a 2nd, a 4th, a 5th, a 7th, a 9th, a 12th, and a 14th position from the pole center.

Further, the present invention relates to two layered armature winding wires of two poles and three phases in a rotary electric machine; and each phase of the winding wires has four parallel connected circuits, and the winding wires are stored in eighty four slots which are divided into two phase belts and provided in a layer stacked iron core. A parallel connected circuit number, which is counted from the pole center of the upper coil pieces and the lower coil pieces in the first phase belt, is arranged in sequence to follow 1, 2, 1, 2, 2, 1, 2, 1, 2, 1, 1, 2, 1, 2. A parallel connected circuit number, which is counted from the pole center of the upper coil pieces and the lower coil pieces in a second phase belt, is arranged in sequence to follow 3, 4, 3, 4, 4, 3, 4, 3, 4, 3, 3, 4, 3, 4.

As shown in FIG. 9, the present invention relates to a rotary electric machine which has a rotor of two poles, eighty four slots, and armature winding wires of three phases, where an upper coil is stored on the inside diameter side of a slot and a lower coil is stored on the outer diameter side of a slot, the upper coil and the lower coil are connected to form an armature winding wire; and this armature winding wire has two phase belts per phase, and the phase belt comprises two parallel winding wires. When the circumferential directional averaged position of all of the upper coils and the lower coils which constitute the phase belts is set as a center of a phase belt, and when the arrangement of the first and second parallel winding wires at least in one phase belt is viewed in an closer order from the center of a phase belt, the upper coils are disposed in an order of a first, a second, a first, a second, a second, a first, a second, a first, a second, a first, a first, a second, a first, and a second of the parallel winding wires; and the lower coils connected with the upper coils are disposed in an order of a first, a second, a first, a second, a second, a first, a second, a first, a second, a first, a first, a second, a first, and a second of the parallel winding wires.

The subject matter of the present invention is to provide a rotary electric machine which has a stator iron core provided with eighty four slots and a two pole four parallel winding wire structure, and is not merely capable of reducing a circulating current, but also is advantageous in working efficiency. The present invention relates to a rotary electric machine which has a plurality of stator slots on the inner circumference side, where stator coils are wound around over the plurality of stator slots, so that parallel connected circuits which have the same number of coil circuits which are to be in parallel connection, may be formed at each phase in the plurality of stator slots; and in addition, is provided with stator iron cores on which two layered winding is performed so that, in each of the stator slots, lower opening side coils and upper opening side coils are configured on the outer circumference side and on the inner circumference side. The slot pitch for connecting the upper opening side coils and the lower opening side coils of the stator coil is equal in each pole coil circuit of the rotary electric machine. The rotary electric machine has a feature in that the pole number is two, the number of coil circuits in the parallel connected circuits is 4, the slot number of each pole and each phase is 84, where the number of the jumper line for changing the combination in the coil connection is reduced, and the interference of a jumper line with other structural objects can be avoided.

Note that, in the present invention, each of the embodiments can be freely combined, appropriately modified and/or eliminated without departing from the scope of the invention.

INDUSTRIAL APPLICABILITY

The rotary electric machine in accordance with the present invention can be used as an intermediate to large capacity rotary electric machine, a turbine generator, and others.

EXPLANATION OF NUMERALS AND SYMBOLS

1 Stator; 2 Rotor; 2a Rotational axis; 2b Conductive line; 2c Wedge; 3 Stator iron core; 3a Stator iron core; 4 Yoke; 9 Jumper line; 10 Case; 11 Slot; 20a X phase series circuit; 20b X phase series circuit; 20c X phase series circuit; 20d X phase series circuit; 21 Lead wire; 100 Rotary electric machine

What is claimed is:

1. A rotary electric machine comprising:
   a rotor which has two poles, and
   a stator in which eighty four slots are formed,
   wherein a first coil piece denoted by t and a second coil piece denoted by b are disposed in each slot of the stator;
   the first coil piece and the second coil piece both form a six phase belt which consists of a U phase+belt, a U phase−belt, a V phase+belt, a V phase−belt, a W phase+belt, and a W phase−belt;
   the first coil piece which forms the six phase belt is referred to as a conductor U+nt, a conductor W−nt, a conductor V+nt, a conductor U−nt, a conductor W+nt, a conductor V−nt, where n is used to denote a natural number of 1 to 14;
   and the second coil piece is referred to as a conductor U+nb, a conductor W−nb, a conductor V+nb, a conductor U−nb, a conductor W+nb, and a conductor V−nb, where n is used to denote a natural number of 1 to 14;
   a conductor U+1t to a conductor U+14t, a conductor U−1b to a conductor U−14b, a conductor U+1b to a conductor U+14b, and a conductor U−1t to a conductor U−14t form a four row parallel winding wire structure of U phase which consists of a first U phase series circuit, a second U phase series circuit, a third U phase series circuit, and a fourth U phase series circuit;
   a conductor V+1t to a conductor V+14t, a conductor V−1b to a conductor V−14b, a conductor V+1b to a conductor V+14b, and a conductor V−1t to a conductor V−14t form a four row parallel winding wire structure of V phase which consists of a first V phase series circuit, a second V phase series circuit, a third V phase series circuit, and a fourth V phase series circuit;
   a conductor W+1t to a conductor W+14t, a conductor W−1b to a conductor W−14b, a conductor W+1b to a conductor W+14b, and a conductor W−1t to a conductor W−14t form a four row parallel winding wire structure of W phase which consists of a first W phase series circuit, a second W phase series circuit, a third W phase series circuit, and a fourth W phase series circuit;
   when X is used to denote any one of U, V, and W,
   conductors are connected in an order of a conductor X+1t, a conductor X−1b, a conductor X+3t, a conductor X−4b, a conductor X+6t, a conductor X−6b, a conductor X+8t, a conductor X−8b, a conductor X+10t, a conductor X−10b, a conductor X+11t, a conductor X−11b, a conductor X+13t, and a conductor X−13b in the first U phase series circuit, the first V phase series circuit, and the first W phase series circuit;
   conductors are connected in an order of a conductor X+2t, a conductor X−2b, a conductor X+4t, a conductor X−3b, a conductor X+5t, a conductor X−5b, a conductor X+7t, a conductor X−7b, a conductor X+9t, a conductor X−9b, and a conductor X+12t, a conductor X−12b, a conductor X+14t, and a conductor X−14b in the second U phase series circuit, the second V phase series circuit, and the second W phase series circuit;
   the conductor X−9b and the conductor X+12t cross at a connection side coil end, and are connected using a jumper line;
   the conductor X−10b and the conductor X+11t are connected at the connection side coil end, using a jumper line;
   the conductor X+4t and the conductor X−3b cross at an anti-connection side coil end, and are connected using a jumper line; and
   the conductor X+3t and the conductor X−4b are connected at the anti-connection side coil end, using a jumper line.

2. The rotary electric machine according to claim 1, wherein
   conductors are connected in an order of a conductor X+1b, a conductor X−1t, a conductor X+3b, a conductor X−4t, a conductor X+6b, a conductor X−6t, a conductor X+8b, a conductor X−8t, a conductor X+10b, a conductor X−10t, a conductor X+11b, a conductor X−11t, a conductor X+13b, and a conductor X−13t, in the third U phase series circuit, the third V phase series circuit, and the third W phase series circuit, and
   conductors are connected in an order of a conductor X+2b, a conductor X−2t, a conductor X+4b, a conductor X−3t, a conductor X+5b, a conductor X−5t, a conductor X+7b, a conductor X−7t, a conductor X+9b, a conductor X−9t, a conductor X+12b, a conductor X−12t, a conductor X+14b, and a conductor X−14t, in the fourth U phase series circuit, the fourth V phase series circuit, and the fourth W phase series circuit.

3. The rotary electric machine according to claim 2, wherein
   the conductor X−9t and the conductor X+12b cross at the connection side coil end, and are connected using a jumper line;
   the conductor X−10t and the conductor X+11b are connected at the connection side coil end, using a jumper line;
   the conductor X+4b and the conductor X−3t cross at the anti-connection side coil end, and are connected using a jumper line; and
   the conductor X+3b and the conductor X−4t are connected at the anti-connection side coil end, using a jumper line.

* * * * *